(12) United States Patent
Barker et al.

(10) Patent No.: US 10,050,271 B2
(45) Date of Patent: Aug. 14, 2018

(54) METAL-CONTAINING COMPOUNDS

(71) Applicant: FARADION LIMITED, Sheffield (GB)

(72) Inventors: Jeremy Barker, Chipping Norton (GB); Richard Heap, Oxford (GB); Noel Roche, Abingdon (GB)

(73) Assignee: FARADION LIMITED, South Yorkshire (GB)

( * ) Notice: Subject to any disclaimer, the term of this patent is extended or adjusted under 35 U.S.C. 154(b) by 163 days.

(21) Appl. No.: 14/647,997

(22) PCT Filed: Nov. 8, 2013

(86) PCT No.: PCT/GB2013/052950
§ 371 (c)(1),
(2) Date: May 28, 2015

(87) PCT Pub. No.: WO2014/083313
PCT Pub. Date: Jun. 5, 2014

(65) Prior Publication Data
US 2015/0303474 A1    Oct. 22, 2015

(30) Foreign Application Priority Data

Nov. 28, 2012 (GB) .................................. 1221425.0
Aug. 8, 2013 (GB) .................................. 1314236.9

(51) Int. Cl.
*H01M 4/88* (2006.01)
*H01M 4/58* (2010.01)
(Continued)

(52) U.S. Cl.
CPC .......... *H01M 4/5825* (2013.01); *C01B 25/37* (2013.01); *C01B 25/372* (2013.01);
(Continued)

(58) Field of Classification Search
CPC ......... B82Y 30/00; C01B 25/37; C01B 25/35; C01B 25/455; H01M 10/058
(Continued)

(56) References Cited

U.S. PATENT DOCUMENTS 4,246,253 A    1/1981   Hunter
5,135,732 A    8/1992   Barboux et al.
(Continued)

FOREIGN PATENT DOCUMENTS

CH            515852 A       11/1971
CN         101332986 A       12/2008
(Continued)

OTHER PUBLICATIONS

Padhi, et al., "Phospho-olivines as Positive-Electrode Materials for Rechargeable Lithium Batteries," J. Electrochem. Soc., vol. 144, No. 4, Apr. 1997, pp. 1188-1194.
(Continued)

*Primary Examiner* — Khanh T Nguyen
(74) *Attorney, Agent, or Firm* — Meunier Carlin & Curfman LLC

(57) ABSTRACT

The invention relates to a novel process for the preparation of metal-containing compounds comprising the steps of a) forming a mixture comprising i) elemental phosphorus and ii) one or more metal-containing precursor compounds, and b) heating the mixture to a temperature of at least 150° C. Materials made by such a process are useful, for example, as electrode materials in alkali metal-ion battery applications.

22 Claims, 25 Drawing Sheets

(51) Int. Cl.
   C01B 25/37    (2006.01)
   C01B 25/45    (2006.01)
   H01M 10/0525  (2010.01)
(52) U.S. Cl.
   CPC .......... *C01B 25/375* (2013.01); *C01B 25/377* (2013.01); *C01B 25/45* (2013.01); *H01M 10/0525* (2013.01); *H01M 2220/30* (2013.01)
(58) Field of Classification Search
   USPC .................. 252/182.1; 429/144, 211, 231.1; 29/623.1
   See application file for complete search history.

(56) References Cited

U.S. PATENT DOCUMENTS

| | | | |
|---|---|---|---|
| 6,203,946 | B1 | 3/2001 | Barker et al. |
| 6,387,568 | B1 | 5/2002 | Barker et al. |
| 6,777,132 | B2* | 8/2004 | Barker .................. C01B 25/455 429/231.1 |
| 9,105,945 | B2* | 8/2015 | Zhou .................... H01M 10/058 |
| 2010/0102270 | A1* | 4/2010 | Jia ........................... C01B 25/37 252/182.1 |
| 2012/0231334 | A1* | 9/2012 | Kinoshita .............. B82Y 30/00 429/211 |
| 2012/0264016 | A1 | 10/2012 | Sueki et al. |
| 2012/0276438 | A1* | 11/2012 | Saka ....................... C01B 25/45 429/144 |
| 2013/0075673 | A1 | 3/2013 | Nishijima et al. |

FOREIGN PATENT DOCUMENTS

| | | |
|---|---|---|
| CN | 102738465 A | 10/2012 |
| EP | 1343720 B1 | 3/2008 |
| EP | 2292557 A1 | 3/2011 |
| GB | 672883 | 5/1952 |
| GB | 2097775 A | 11/1982 |
| JP | 2011075594 A | 4/2011 |
| WO | 2011152455 A1 | 12/2011 |

OTHER PUBLICATIONS

Lin, et al., "Chemistry and structural chemistry of phosphides and polyphosphides 55* Synthesis and structure of $Na_6WP_4$, $Na_5SrNbP_4$ and $Na_5SrTaP_4$**," Journal of Alloys and Compounds, 1992, 183, pp. 403-412.
Rho, et al., "Surface Chemistry of $LiFePO_4$ Studied by Mössbauer and X-Ray Photoelectron Spectroscopy and Its Effect on Electrochemical Properties," Journal of The Electrochemical Society, 2007, 154(4), pp. A283-A289.
Rosenstein, "Red Phosphorus As a Reducing Agent," J. Am. Chem. Soc., 1920, 42(5), pp. 883-889.
Toprakci, et al., "Fabrication and Electrochemical Characteristics of $LiFePO_4$ Powders for Lithium-Ion Batteries," KONA Powder & Particle Journal, 2010, No. 28, pp. 50-73.
Great Britain Intellectual Property Office Search Report for Great Britain Patent Application No. GB1221425.0, dated May 9, 2013.
Great Britain Intellectual Property Office Combined Search and Examination Report for Great Britain Application No. GB1314236.9.
International Search Report and Written Opinion, dated Feb. 25, 2014, in International Application No. PCT/GB2013/052950.
Response to International Search Report and Written Opinion pursuant to PCT Article 19, dated Apr. 16, 2014, in International Application No. PCT/GB2013/052950.
Second Written Opinion of the International Preliminary Examining Authority, dated Nov. 4, 2014, in International Application No. PCT/GB2013/052950.
International Preliminary Report on Patentability, dated Mar. 25, 2015, and Applicant's Response to Second Written Opinion of the International Preliminary Examining Authority annexed thereto, in International Application No. PCT/GB2013/052950.
Great Britain Intellectual Property Office Search Report for Great Britain Patent Application No. GB1221425.0, dated Jan. 20, 2014.
Great Britain Intellectual Property Office Search Report for Great Britain Patent Application No. GB1221425.0, dated Jan. 21, 2014.
Office Action issued in Japanese Application No. 2015-544527, dated Sep. 5, 2017.

* cited by examiner

METAL-CONTAINING COMPOUNDS

FIELD OF THE INVENTION

The present invention relates to a novel process for the preparation of metal-containing compounds and to the use of these in electrodes for energy storage devices and the like.

BACKGROUND OF THE INVENTION

Lithium-ion battery technology has enjoyed a lot of attention in recent years and provides the preferred portable battery for most electronic devices in use today. Such batteries are "secondary" or rechargeable which means they are capable of undergoing multiple charge/discharge cycles. Typically lithium-ion batteries are prepared using one or more lithium electrochemical cells containing electrochemically active materials. Such cells comprise an anode (negative electrode), a cathode (positive electrode) and an electrolyte material. When a lithium-ion battery is charging, $Li^+$ ions de-intercalate from the cathode and insert into the anode. Meanwhile charge balancing electrons pass from the cathode through the external circuit containing the charger and into the anode of the battery. During discharge the same process occurs but in the opposite direction.

Various electrochemically active materials have been suggested for use as the cathode materials, for example $LiCoO_2$, $LiMn_2O_4$ and $LiNiO_2$, see U.S. Pat. No. 5,135,732 and U.S. Pat. No. 4,246,253. However these materials exhibit problems, for example cycle fading (depletion in charge capacity over repeated charge/discharge cycles), which make them commercially unattractive. Attempts to address cycle fading have led to lithium metal phosphate and lithium metal fluorophosphates becoming favourable materials. Such materials were first reported in U.S. Pat. Nos. 6,203,946, 6,387,568, and by Goodenough et al. in "Phospho-olivines as Positive-Electrode Materials for Rechargeable Lithium Batteries", Journal of Electrochemical Society, (1997) No. 144, pp1188-1194.

Many workers have tried to provide economical and reproducible synthesis methods for phosphate-containing materials, and especially for high performance (optimised) phosphate-containing materials. A review of the prior art methods which describe the preparation of one particular lithium metal phosphate, namely, lithium iron phosphate ($LiFePO_4$), is given by X. Zhang et al in "Fabrication and Electrochemical Characteristics of $LiFePO_4$ Powders for Lithium-Ion Batteries", KONA Powder and Particle Journal No. 28 (2010) pp 50-73. As this review demonstrates, a lot of effort has been expended since lithium iron phosphate was first identified in 1997, to find the most expedient method for producing a $LiFePO_4$ material with the best all round performance; for example solid-state synthesis using mechanochemical activation to increase the activation of the starting materials, microwave heating to control the particle size of the active cathode material, and carbothermal reduction which enables Fe(III) e.g. in the form of $Fe_2O_3$ or $FePO_4$ (i.e. cheap and readily available sources of iron) to be used as a precursor material. The carbothermal reduction process is a high-temperature reduction reaction (typically 550° C. to 850° C.) which commonly utilizes carbon black, graphite or pyrolyzed organic chemicals as the source of carbon reducing agent. Carbothermal reduction is a highly endothermic reaction, hence the reaction temperature must be sufficient to drive the reaction. In addition, since solid carbon is used as the reducing agent, all the precursors and reactants must be kept in good contact throughout the reaction, nevertheless as reported in the review mentioned above, carbothermal reduction is excellent for the reduction of Fe(III), the stabilization of Fe(II), the control of particle morphology, and the enhancement of electrical conductivity by coating $LiFePO_4$ with residual carbon.

Particulate reducing agents other than carbon, specifically silicon oxide, titanium oxide and elemental metals such as Fe, Co, Ni, Mn, Cu, V, Ti, Cr, Nb, Mo, Mg, Ca, Zn, Sr, Pb, Cd, Sn, Ba, Be, Al and B are disclosed in EP1 343 720.

The most interesting cathode materials are those which have large charge capacity, are capable of good cycling performance, highly stable, and of low toxicity and high purity. To be commercially successful, the cathode materials must also be easily and affordably produced. This long list of requirements is difficult to fulfil but, as detailed in the review mentioned above, the active materials most likely to succeed are those with small particle size and narrow size distribution, with an optimum degree of crystallinity, a high specific surface area and with uniform morphology.

Due to its reactivity elemental phosphorus is never found naturally occurring in the Earth, but calcium phosphate rock is mined and using a carbothermal-type reduction process this is typically converted into phosphoric acid and then ammonium phosphate before being used as a precursor of fertilisers and animal feed. To a lesser extent calcium phosphate rock is also a source of elemental phosphorus which is converted into sodium hypophosphite ($NaH_2PO_2$) or phosphorus trichloride which is a precursor of glyphosate (a non-selective herbicide).

Elemental phosphorus exists in a number of forms characterised visually by their colour as white, red, violet and black. The two major forms, white and red phosphorus, behave very differently from each other. The former allotrope contains discrete $P_4$ molecules, is crystalline, highly toxic and highly reactive, e.g. it spontaneously ignites in air at room temperature. Red phosphorus, on the other hand is highly polymeric $P_n$, amorphous or crystalline, of very low toxicity and of much lower reactivity. Almost half (44%) of the 7000 tons of red phosphorus produced per year is used in the strike strip on match boxes; 24% is used in the manufacture of aluminium phosphide (used in semi conductors and as a fumigant); 18% as flame retardants in plastics, especially for polyamides in electronics, polyurethanes and latex; 6% in pyrotechnics.

In addition to the reactions described above, it is known to use red phosphorus in combination with aqueous hydrogen iodide to provide an effective reducing agent in organic chemistry and the use of red phosphorus in, for example, hydrogenation reactions, deoxygenation of alcohols, ketones, ketoacids and quinones, the cleavage of phenol ethers, and reductive cleavage of lactones are all documented in the literature. Red phosphorus is also known to reduce acidic solutions of metallic salts to yield binary metallic phosphides, as reported by Ludwig Rosenstein in J. Am, Chem. Soc., 1920, 42 (5). pp 883-889.

Further prior art, for example CH515852A, describes the preparation of magnesium phosphide ($Mg_3P_2$) using magnesium metal and elemental phosphorus. In this preparation, the oxidation state of the phosphorus changes from $P^0$ (elemental phosphorus), to $P^{3-}$ in $Mg_3P_2$; and the oxidation state of magnesium changes from $Mg^0$ (magnesium metal) to $Mg^{2+}$ in $Mg_3P_2$. Thus, this reaction proceeds by the reduction of phosphorus and the oxidation of magnesium.

In prior art document Lin et al. J. Alloys and Compounds 183, 403-412, 1992, phosphides such as $Na_6WP_4$, $Na_5SrNbP_4$ and $Na_5SrTaP_4$ using precursor materials: binary phosphides ($Na_3P$ and SrP), red phosphorus and the corresponding metal powder (tungsten, niobium and tantalum). As above, the oxidation state of the red phosphorus metal starting material changes from $P^0$ to $P^{3-}$ in the final products. Thus this reaction proceeds by the reduction of phosphorus and the oxidation of the precursor metal powder materials.

The present invention aims to provide a fast, reliable and cost effective process for the preparation of metal-containing compounds and including but not limited to alkali metal-containing compounds. Advantageously, the process of the present invention aims to provide metal-containing compounds that meet the structural and alkali ion insertion properties needed for commercially viable cathode active materials. To this end, the present invention provides a process for the preparation of a metal-containing compound comprising using i) elemental phosphorus and ii) one or more metal-containing precursor compounds. Preferably, the process of the present invention produces metal-containing compounds that comprise one or more metals which have an average oxidation state that is lower than the average oxidation state of the one or more metals in the one or more metal-containing precursor compounds. Further preferably the process is conducted by heating the reaction mixture to at least 150° C.

Ideally, the present invention is conducted in the absence of an acidic medium that consists essentially of one or more selected from dilute aqueous hydrochloric acid, dilute aqueous sulphuric acid and dilute aqueous nitric acid. Also preferably, the metal-containing compound is other than or in addition to a binary metal phosphide and/or a metal in oxidation state 0. In particular, the present invention is not concerned with the preparation of metal phosphides (compounds consisting essentially of one or more metals and phosphorus) in the absence of any other metal-containing compounds also being prepared, or with the preparation of metals in their elemental state in the absence of any other metal-containing compounds also being prepared, or with the preparation of a combination of such metal phosphides and metals in their elemental state in the absence of any other metal-containing compounds also being prepared. Still further preferably, the process of the present invention employs two or more metal-containing precursor compounds.

In particular, the above process of the present invention provides comprises reacting i) elemental phosphorus with ii) one or more metal-containing precursor compounds wherein the one or more metal-containing precursor compounds comprise one or more elements selected from alkali metals, transition metals, non-transition metals and metalloids. In the context of this invention the term "metalloid" is an element with both metal and non-metal characteristics.

Ideally, the present invention provides a process in which the metal-containing compound comprises one or more metals which have an average oxidation state which is lower than the average oxidation state of the one or more metals in the metal-containing precursor compounds. Further ideally, one or more of the metal-containing compounds and metal-containing precursor compounds comprise one or more transition metals.

In a highly preferred process, the present invention produces compounds containing one or more alkali metals. Such compounds include alkali metal (metal)-containing compounds and are produced by reacting i) elemental phosphorus with ii) one or more metal-containing precursor compounds comprising one or more alkali metals optionally together with one or more metals selected from transition metals and/or non transition metals and/or metalloids. Additional separate transition metal- and/or non transition metaland/or metalloid-containing precursor compound(s) may also be used, especially, but not exclusively, when the alkali metal-containing precursor compound does not already comprise a transition metal, non transition metal and/or metalloid.

A preferred process of the present invention produces a metal-containing compound of the formula:

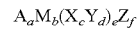

wherein:
A is an alkali metal selected from one or more of lithium, sodium and potassium;
M comprises one or more metals selected from transition metals, non-transition metals and metalloids;
$(X_cY_d)_e$ is at least one first anion; and
Z is at least one second anion
wherein a≥0; b>0; c>0; d≥0; e>0 and f≥0;
wherein a, b, c, d, e and f are chosen to maintain electroneutrality.

Desirably, the process of the present invention produces a metal-containing compound, for example of the formula $A_aM_b(X_cY_d)_eZ_f$, in which M comprises one or more transition metals and/or non transition metals and/or metalloids which have an average oxidation state which is lower than the average oxidation state of the one or more metals (transition metals and/or non transition metals and/or metalloids) in the metal-containing precursor compounds.

The most preferred metal-containing compounds produced by the process of the present invention are of the formula:

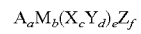

wherein:
A is an alkali metal selected from one or more of lithium, sodium and potassium;
M comprises one or more transition metals and optionally one or more further metals selected from non-transition metals and metalloids;
$(X_cY_d)_e$ is at least one first anion; and
Z is at least one second anion
wherein a≥0; b>0; c>0; d≥0; e>0 and f≥0;
wherein a, b, c, d, e and f are chosen to maintain electroneutrality.

The addition of elemental phosphorus is crucial to the success of the invention and depending upon the particular one or more metal-containing precursor compounds, and the desired final product, its presence may be either a) as a reducing agent or b) as a source of phosphorus in the final product, or, in many cases, for both of these reasons. When behaving as a reducing agent, at least some of the elemental phosphorus serves to reduce the average oxidation state of the metal components of the metal-containing precursor compounds. This is particularly beneficial in the case where the metal is a transition metal. Preferably at least some of the elemental phosphorus is oxidized during the process of the present invention. When the at least some of the elemental phosphorus is behaving as a source of phosphorus in the metal-containing compound, it is incorporated into the metal-containing compound, for example $A_aM_b(X_cY_d)_eZ_f$, at a higher oxidation state than its elemental state. When elemental phosphorus is used as a source of phosphorus, this may provide a partial phosphorus source in the desired final product, in which case another source of phosphorus (e.g. a phosphate starting material) may also be used, or alternatively, the amount of elemental phosphorus used may be sufficient to obviate the need for any additional phosphate starting material. The fact that the elemental phosphorus is able to act both as the reducing agent and as a source of phosphorus in the metal-containing compound is seen as one of the many advantages of the present invention.

In one group of compounds of the formula $A_aM_b(X_cY_d)_eZ_f$, it is preferable that when a=0, then $(X_cY_d)_e$ is not a phosphide group. Further, the present invention preferably does not include the preparation of one or more binary phosphides (compounds consisting essentially of a metal and phosphorus) in the absence of any other compound of the formula $A_aM_b(X_cY_d)_eZ_f$.

In a particularly preferred process, alkali metal (metal)-containing compounds are prepared. Such compounds may have the formula $A_aM_b(X_cY_d)_eZ_f$ where A is one or more alkali metals, M comprises one or more transition metals and/or one or more non transition metals and/or one or more metalloids, and X, Y, and Z are as defined below.

In such alkali metal (metal)-containing compounds, a>0, b>0, c>0, d≥0, e>0 and F≥0.

In the reaction products produced by the process of the present invention:

A preferably comprises one or more alkali metals selected from sodium, lithium and potassium;

M comprises one or more metals selected from transition metals such as titanium, vanadium, niobium, tantalum, hafnium, chromium, molybdenum, tungsten, manganese, iron, osmium, cobalt, nickel, palladium, platinum, copper, silver, gold, zinc, cadmium, aluminium, scandium, yttrium, zirconium, technetium, rhenium, ruthenium, rhodium, iridium, mercury, gallium, indium, tin, lead, bismuth and selenium, non transition metals such as magnesium, calcium, beryllium, strontium and barium, and metalloids such as boron, silicon, germanium, arsenic, antimony and tellurium;

X comprises one or more elements selected from titanium, vanadium, chromium, arsenic, molybdenum, tungsten, niobium, manganese, aluminium, selenium, boron, oxygen, carbon, silicon, phosphorus, nitrogen, sulfur, fluorine, chlorine, bromine and iodine.

Y comprises one or more moieties selected from halides, sulfur, sulfur-containing groups, oxygen, oxygen-containing groups and mixtures thereof;

Z is selected from one or more halides, hydroxide-containing groups and mixtures thereof.

The elemental phosphorus used in the present invention may be any one or a mixture of the polymeric and amorphous allotropes discussed above. Ideally, however, the elemental phosphorus used comprises a major constituent of red phosphorus.

Desirable compounds of the formula $A_aM_b(X_cY_d)_eZ_f$ include, but are not limited to, those in which A is lithium and/or sodium, and in which the first anion $(X_cY_d)_e$ comprises one or more groups, preferably selected from phosphate, hypophosphite, condensed polyphosphate, sulfate, oxide, thiosulfate, sulfite, chlorate, bromate, oxyhalide, halide, silicate, arsenate, selenate, molybdate, vanadate groups and any oxyanion groups. Compounds where X comprises phosphorus, for example in which $(X_cY_d)_e$ is a $PO_4$ and/or $P_2O_7$ moiety are especially preferred. Similarly, compounds in which X comprises sulfur are equally advantageous, such as those containing $SO_4$ moieties. Compounds of the general formula $A_aM_b(X_cO_d)_eZ_f$ are especially preferred.

Other favourable materials include:
$LiFePO_4$,
$LiFePO_4/Fe_2P$,
$LiMnPO_4$,
$LiCoPO_4$,
$LiNiPO_4$,
$NaFePO_4$,
$NaMnPO_4$,
$NaCoPO_4$,
$NaNiPO_4$,
$LiMn_{0.5}Fe_{0.2}Mg_{0.3}PO_4$,
$Li_3V_2(PO_4)_3$,
$Na_4Fe_3(PO_4)_2P_2O_7$,
$Na_3V_2(PO_4)_3$,
$LiMn_{0.5}Fe_{0.5}PO_4$,
$Na_7V_4(P_2O_7)_4PO_4$,
$Na_7V_3(P_2O_7)_4$,
$Na_2Fe(SO_4)_2$,
$NaVPO_4F$,
$LiVPO_4F$,
$Na_3V(PO_4)_2$,
$Li_3V(PO_4)_2$,
$NaVOPO_4$,
$LiVOPO_4$,
$LiV_2O_5$,
$NaV_2O_5$,
$NaVO_2$,
$VPO_4$,
$MoP_2O_7$,
$MoOPO_4$,
$Fe_3(PO_4)_2$,
$Na_{8-2x}Fe_{4+x}(P_2O_7)_4$,
$Na_{8-2x}Mn_{4+x}(P_2O_7)_4$,
$Na_2MnP_2O_7$,
$Na_2FeP_2O_7$,
$Na_2CoP_2O_7$,
$Na_4Mn_3(PO_4)_2P_2O_7$,
$Na_4CO_3(PO_4)_2P_2O_7$,
$Na_4Ni_3(PO_4)_2P_2O_7$,
$NaFeSO_4F$,
$LiFeSO_4F$,
$NaMnSO_4F$,
$LiMnSO_4F$,
$Na_2FePO_4F$,
$Na_2MnPO_4F$,
$Na_2COPO_4F$,
$Na_2NiPO_4F$,
$Na_2Fe_2(SO_4)_3$,
$Li_2Fe_2(SO_4)_3$, and
$Li_2Fe(SO_4)_2$.

Advantageously, the present invention provides a process for the preparation of phosphate-containing materials comprising using elemental phosphorus as a reducing agent and/or source of phosphorus.

In particular, the present invention provides a process for the preparation of a compound comprising a lithium metal phosphate of the general formula: $LiMPO_4$, where M comprises a metal selected from one or more of manganese, iron, cobalt, copper, zinc, nickel, magnesium and calcium, the process comprising using elemental phosphorus as a reducing agent and/or a source of phosphorus.

Preferred $LiMPO_4$—containing compounds include $LiFePO_4$—containing compounds and these may be produced in the process of the present invention by reacting elemental phosphorus with one or more metal-containing precursor compounds which may include, but are not limited to a selection from $LiH_2PO_4$, $Li_2HPO_4$, $LiOH$, $LiOH.H_2O$, $Fe_3O_4$, $H_3PO_4$, $(NH_4)_2HPO_4$, $(NH_4)H_2PO_4$, $Fe_2O_3$, $Li_2CO_3$, $FePO_4.xH_2O$, $FePO_4$, $Fe_3(PO_4)_2$, $FeSO_4.xH_2O$, $Fe(NO_3)_3$, $Fe(CH_3CO_2)_2$, $C_6H_8O_7.xFe^{3+}.yNH_3$ (ammonium iron (III) citrate), $C_6H_5FeO_7$ (iron (III) citrate). and $Fe(C_5H_7O_2)_3$ (iron (III) 2,4-petanedionate). Any other suitable precursor compound may also be chosen.

A convenient way to perform the process of the present invention is by:
1. forming a mixture comprising i) one or more metal-containing precursor compounds and ii) elemental phosphorus;
2. heating the mixture to a temperature of at least 150° C.; and
3. recovering the resultant product, preferably a metal-containing compound of the formula:

$$A_a M_b (X_c Y_d)_e Z_f$$

wherein A is one or more alkali metals selected from lithium, sodium and potassium, M comprises one or more metals selected from transition metals, non transition metals and metalloids, $(X_c Y_d)_e$ is at least one first anion and z is at least one second anion, and wherein a≥0, b>0, c>0, d≥0, e>0 and f≥0.

Further preferably the reaction mixture is heated to a temperature of at least 160° C.

Ideally the starting materials are intimately admixed in particulate form. This can be achieved using various methods, for example by finely grinding the materials separately using a pestle and mortar or a ball mill, and then mixing them together, or the materials can be admixed whilst they are being finely ground. The grinding and admixing is of sufficient duration to produce a uniformly intermixed finely ground powder. If a high energy mixing process is used, it may be advantageous to add the required amount of elemental phosphorus after this step, using a less vigorous mixing process. A solvent such as acetone or another material which is easily removed, for example a low boiling liquid, can be used to assist the grinding/admixing process and this is preferably removed prior to the heating step. Other known techniques such as high energy ball milling and microwave activation may also be used to help prepare the starting materials, for example to increase their reactivity.

The present invention may be performed as a "solid-state" reaction i.e. a reaction in which all of the reactants are in solid form and are substantially free of any reaction medium such as a solvent. It is possible to use a solvent or other low boiling liquid to assist the mixing of the reactants, as described above; preferably when a solid state reaction process is to be used then this solvent/low boiling liquid is substantially removed prior to the heating step.

It is also possible to use a solution based reaction, for example where one or more of the metal-containing precursor compounds is mixed with or dissolved in a solvent such as water, and in addition, or alternatively, one or more other precursor compounds, such as $P_2O_5$ and $H_3PO_4$ may be conveniently mixed with or dissolved in water.

The reaction between the starting materials (where some or all are either in solid form, or mixed and/or dissolved in a solvent) generally occurs during the heating step of the process, which typically involves heating the reaction mixture either at a single temperature, or over a range of temperatures, for example greater than 150° C., preferably up to at least 160° C., preferably at least 200° C. and further preferably up to at least 300° C. A single or a range of reaction temperatures of from greater than 150° C. to 1200° C. is preferred, with from at least 200° C. to 1200° C. being very preferred and 150° C. to 800° C. being particularly preferred. Such a heating regime is quite different from that described in the prior art which boils red phosphorus and metallic salts in dilute aqueous acidic solutions; the latter would utilise a considerably lower reaction temperature of close to 100° C.

Conveniently the reaction is performed under atmospheric pressure and under a non-oxidising atmosphere, for example nitrogen, argon or another inert gas, or under vacuum. If using an inert gas during the reaction, it is beneficial to flush the reaction vessel with the inert gas in order to expel any air present. In some cases it is also advantageous to use a low flow rate of said gas, for example less than 4 litres/minute.

Advantageously, and highly unexpectedly it has also been found that the reaction process of the present invention may also be performed under an atmosphere comprising a partial pressure of oxygen. In this case, the oxygen may be obtained or derived from any convenient source, for example oxygen gas, such as sourced from an oxygen gas cylinder or other suitable container, or an oxygen precursor material such as hydrogen peroxide (e.g. by heating or in the presence of a catalyst), other peroxides, metal nitrates, potassium permanganate, potassium bromate or water (e.g. by electrolysis), or obtaining oxygen from an oxygen generating biomaterial.

Therefore, the process of the present invention comprises the steps of:
1. forming a mixture comprising i) one or more metal-containing precursor compounds and ii) elemental phosphorus;
2. heating the mixture to a temperature of at least 150° C.; and
3. recovering the resultant product, preferably a metal-containing compound of the formula:

$$A_a M_b (X_c Y_d)_e Z_f$$

wherein A is one or more alkali metals selected from lithium, sodium and potassium, M comprises one or more metals selected from transition metals, non transition metals and metalloids, $(X_c Y_d)_e$ is at least one first anion and z is at least one second anion, and wherein a≥0, b>0, c>0, d≥0, e>0 and f≥0; wherein step 2. is optionally carried out under an atmosphere comprising a partial pressure of oxygen.

Preferably the atmosphere comprising a partial pressure of oxygen may also comprise other gases such as nitrogen and/or one or more inert gases such as argon. Air is a particularly useful and cost effective source of oxygen. The exact partial pressure of oxygen needed for the reaction of the present invention is preferably calculated to be sufficient to ensure a stoichiometric amount of oxygen; an excess of oxygen might cause unwanted side reactions with the elemental phosphorus, and too little oxygen could result in a reduction in the yield of the target product.

The reaction scheme using a partial pressure of oxygen for one favoured target material is as follows:

$$0.5Li_2CO_3 + 0.5Fe_2O_3 + 1P + 1O_2 \rightarrow LiFePO_4 + 0.5\ CO_2$$

Depending on the target material and the precursors used, the process of the present invention may be performed in a sealed reaction vessel. A preferred sealed reaction vessel is a Carbolite tube furnace, comprising a non-porous ceramic tube of 75 mm internal diameter.

A sealed reaction vessel may also be used when conducting the reaction under a partial pressure of oxygen; however, in such a case it is desirable to maintain a substantially constant partial pressure of oxygen. This may be achieved by accommodating the volume changes which naturally occur as the reaction temperature changes during the process, for example during the heating step. The provision of inflatable expansion vessels attached to the reaction vessel, such as described in detail below, has been found to be a particularly convenient way to achieve this. It is also highly convenient to tailor the amount of precursor reactant mix to the volume of oxygen (for example, derived from air) contained within a sealed reaction vessel.

Advantageously, the reaction temperature is maintained for between 0.5 and 72 hours, although the exact time will depend on the reactivity of the starting materials. Between 0.5 and 8 hours has been found to be sufficient for many reactions utilising the process of the present invention, particularly when the reaction temperature is 500° C. or above. When the reaction synthesis is performed at relatively low temperatures, for example 400 ° C. or below, then using a longer dwell time of 12 to 72 hours, preferably 24 to 48 hours, is found to achieve the desired reaction product. The exact reaction temperature and dwell time will be chosen to provide the most commercially advantageous reaction process for a given target material.

As discussed above, elemental phosphorus has two potential roles in the process of the present invention; a) as a metal (transition metal and/or non transition metal and/or metalloid) reducing agent, and b) as a source of phosphorus. Which role it plays will depend on the particular reactants, the reaction atmosphere being used, and the quantities of reactants used. In the case where the elemental phosphorus behaves only as a reducing agent, the amount of elemental phosphorus required will depend on the number of electrons being gained by the metal M during the reaction process. For example, in reactions using iron as the metal M, the expected phosphorus redox scheme for iron reduction ($Fe^{3+} \rightarrow Fe^{2+}$) is:

$$P^0 \rightarrow P^{5+} + 5e^-$$

$$e^- + Fe^{3+} \rightarrow Fe^{2+}$$

Giving an overall molar ratio of:

$$5Fe^{3+} + P^0 \rightarrow 5Fe^{2+} + P^{5+}$$

In other words 0.2 moles of phosphorus should be required to reduce 1 mole of $Fe^{2+}$.

Similarly, in reactions using vanadium as the metal M, the expected phosphorus redox scheme for vanadium reduction ($V^{5+} \rightarrow V^{3+}$) is:

$$P^0 \rightarrow P^{5+} + 5e^-$$

$$2e^- + V^{5+} \rightarrow V^{3+}$$

Giving an overall molar ratio of:

$$5V^{5+} + 2P^0 \rightarrow 5V^{3+} + 2P^{5+}$$

In this case, 0.4 moles of phosphorus should be needed to reduce 1 mole of $V^{5+}$.

In a preferred reaction scheme, lithium iron phosphate is prepared according to the process of the present invention from: a lithium-containing precursor material (for example lithium carbonate), a source of phosphorus (for example lithium dihydrogen phosphate), a source of iron (III) (for example iron (III) oxide and/or iron phosphate ($FePO_4$)) and elemental phosphorus.

Based on the reaction schemes above, if $Fe_2O_3$ is the source of iron, the following molar ratio can be deduced:

$$0.1Li_2CO_3 + 0.8LiH_2PO_4 + 0.5Fe_2O_3 + 0.2P \rightarrow 1LiFePO_4 + 0.1CO_2 + 0.8H_2O$$

In another preferred reaction scheme, a phosphorus source such as lithium dihydrogen phosphate may be omitted and the elemental phosphorus may be used as the sole source of phosphorus in the target metal-containing compound. Alternatively, lithium dihydrogen phosphate may be replaced with one or more other phosphate-containing materials or further alternatively replaced by one or more non-phosphate-containing materials such as phosphorus pentoxide ($P_2O_5$) as the source of phosphorus. Some or all, of the source of phosphorus, may be provided by one or more of any of elemental phosphorus, phosphate- and non-phosphate-containing materials.

The metal-containing materials of formula $A_aM_b(X_cY_d)_eZ_f$ prepared by the process of the present invention are suitable for use in many different applications, for example as the active material in electrodes, particularly cathodes used in energy storage devices, rechargeable batteries, electrochemical devices and electrochromic devices. This is especially the case for alkali metal (metal)-containing materials. Advantageously, the electrodes made using the materials produced by the present invention are used in conjunction with a counter electrode and one or more electrolyte materials. The electrolyte materials may be any conventional or known materials and may comprise either aqueous electrolyte(s) or non-aqueous electrolyte(s).

An inherent problem with a number of metal-containing compounds, especially alkali metal-containing compounds, is their low electrical conductivity. To address this problem it is known to add conductive materials such as carbon-containing materials for example, graphite, carbon black, sucrose and acetylene black either to the starting materials, such as during grinding, or as a coating to the final metal-containing products. Other known conductive materials include metal powders and other highly conductive inorganic materials.

It is therefore desirable, when making inherently non-conductive materials such as alkali metal-containing compounds using the process of the present invention, to add one or more conductive materials to the reaction mixture and/or to one or more of the starting materials and/or to the final product.

Notwithstanding the above, another particularly useful advantage of the process of the present invention which uses elemental phosphorus, is that the reaction surprisingly produces $A_aM_b(X_cY_d)_eZ_f$ compounds, and indeed non-conductive compounds such as alkali-metal-containing compounds, which exhibit significantly better electrochemical results than would be expected for similar compounds made using other methods that do not employ elemental phosphorus. As discussed above, it is usually the case that to obtain a high specific capacity material with low voltage polarization, that is voltage hysteresis between the charge and discharge processes, it is necessary for the electrode material to include intimately dispersed conductive material such as carbon, either during the synthesis step (for example by a carbothermal process) or by the use of a secondary carbon coating process. However, the Applicant has found that there is no need to add a separate conductive material to the compounds produced by the process of the present invention. The reason for this is that they exhibit excellent performance without the addition of carbon to the reaction mixture. Furthermore, the Applicant has also observed excellent electrochemical results even when carbon is not added during the formulation of the electrode.

It is believed that the $A_aM_b(X_cY_d)_eZ_f$ compounds produced by the process of the present invention may, where the starting materials so favour, be in the form of a composite material that includes a conductive compound which is preferably produced in situ during the reaction between the metal-containing precursor compounds and elemental phosphorus. The conductive compound formed in situ is preferably a phosphorus-containing compound, and a suitable conductive material may comprise, at least in part, a transition metal phosphide- and/or a non-transition metal phosphide- and/or a metalloid phosphide-containing material such as, in the case where the metal component M comprises iron, an iron phosphide-containing material, for example $Fe_2P$. This latter iron phosphide material in particular, is known to be highly conductive.

Thus in a second aspect, the present invention provides a composition comprising a metal-containing compound e.g. of the formula $A_aM_b(X_cY_d)_eZ_f$ as defined above, and one or more conductive materials, wherein at least a portion of the one or more conductive materials is formed in situ during the process comprising reacting i) elemental phosphorus with ii) one or more metal-containing precursor compounds. Desirably the invention provides a composition comprising $LiFePO_4$ and at least one conductive material comprising one or more phosphide-containing compounds. Suitable phosphide-containing compounds may include, but are not limited to binary phosphides.

Further, in a third aspect, the present invention provides a process for preparing a composition comprising a metal-containing compound, e.g. of the formula $A_aM_b(X_cY_d)_eZ_f$ defined as above, and one or more phosphorus-containing conductive materials, comprising the step of reacting i) elemental phosphorus with ii) one or more metal-containing precursor compounds.

In a fourth aspect, the present invention provides an electrode which utilises active materials of formula $A_aM_b(X_cY_d)_eZ_f$, prepared in accordance with the present invention as described above, especially an electrode which utilises a composition comprising such active materials in combination with a phosphorus-containing conductive material, and particularly a phosphorus-containing conductive material which has been made, at least in part, during the reaction process described above involving elemental phosphorus.

In still further aspects, the present invention provides an energy storage device comprising an electrode as described above, for use as one or more of the following: a sodium ion and/or lithium ion and/or potassium ion cell; a sodium metal and/or lithium metal and/or potassium metal ion cell; a non-aqueous electrolyte sodium ion and/or lithium ion and/or potassium ion cell; and an aqueous electrolyte sodium ion and/or lithium ion and/or potassium ion cell. Specifically, the energy storage device may be a battery.

BRIEF DESCRIPTION OF THE DRAWINGS

The present invention will now be described with reference to the following figures in which.

DETAILED DESCRIPTION

General Method

Figure 1A:
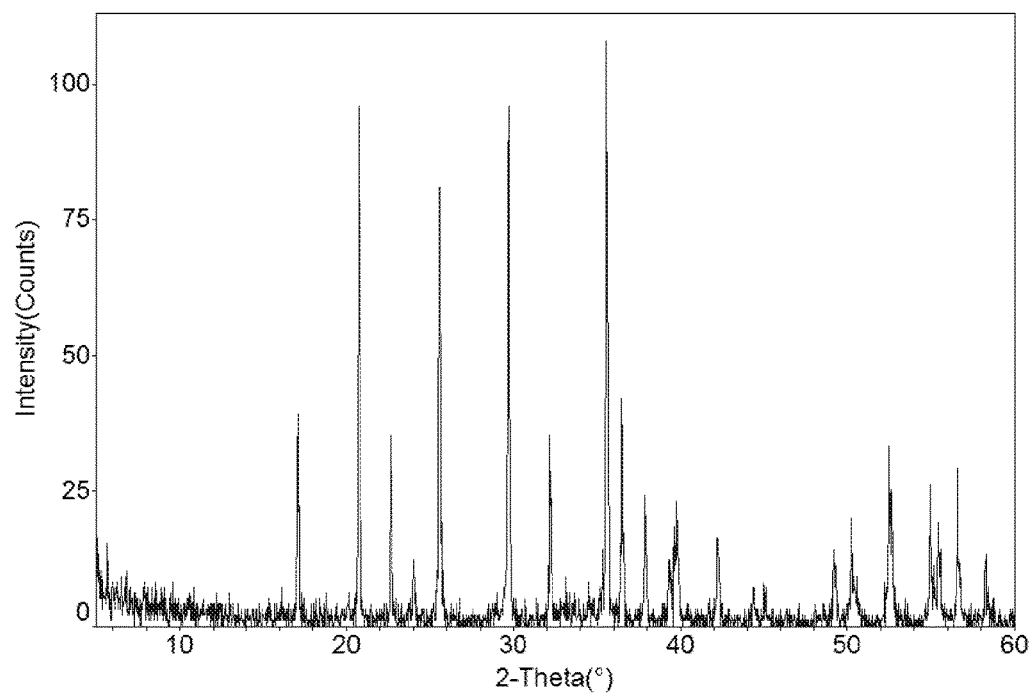
FIG. 1A is an XRD profile for $LiFePO_4$ active material produced according to Example 1 of the present invention.

1) Intimately mix together the starting materials in the correct stoichiometric ratio and press into a pellet.

2) Heat the resulting mixture in a furnace under an inert atmosphere, at a furnace temperature of between 300° C. and 800° C. until reaction product forms.

3) Allow the product to cool before grinding it to a powder.

The desired target reaction product is obtainable irrespective of the order in which the starting materials are mixed together. However, if a high-energy mixing process is used, then certain advantages may be obtained if the starting materials minus the elemental phosphorus are mixed with high energy first, before adding elemental phosphorus and mixing using a less vigorous mixing process.

The starting materials and reaction conditions used in Examples 1 to 12 are summarised in Table 1 below:

TABLE 1

| EXAMPLE | STARTING MATERIALS | TARGET PRODUCT | REACTION CONDITIONS |
|---|---|---|---|
| 1 | 0.5 $Li_2CO_3$<br>1 $FePO_4$<br>0.2 Red phosphorus (0% excess reducing power)<br>[$FePO_4$ prepd by heating $FePO_4 \cdot 2H_2O$ at 400° C., in air, for 16 h] | $LiFePO_4$ (sample X0851, cell#210021) | Mixing solvent: Acetone.<br>$N_2$, 550° C., dwell time of 6 hours. |
| 2 | 0.09 $Li_2CO_3$<br>0.82 $LiH_2PO_4$<br>0.5 $Fe_2O_3$<br>0.18 Red phosphorus (10% deficient reducing power) | $LiFePO_4$ (sample X0776, Cell #209052) | Mixing solvent: Acetone.<br>$N_2$, 650° C., dwell time of 8 hours. |
| 3 | 0.12 $Li_2CO_3$<br>0.76 $LiH_2PO_4$<br>0.50 $Fe_2O_3$<br>0.24 Red phosphorus (20% excess reducing power) | $LiFePO_4$ (sample X0686, Cell #208052)<br>No carbon in the precursor mix and no carbon in the electrode | Mixing solvent: None.<br>$N_2$, 650° C., dwell time of 6 hours. |
| 4 Comparative | 1 $LiH_2PO_4$<br>1 $Fe(C_2O_4) \cdot 2H_2O$ | $LiFePO_4$ (sample X0650, Cell # 207072) | Mixing solvent: None.<br>$N_2$, 750° C., dwell time of 8 hours. |
| 5 Comparative | 1 $LiH_2PO_4$<br>0.5 $Fe_2O_3$<br>0.625 C | $LiFePO_4$ (sample X0649, Cell #207071) | Mixing solvent: None.<br>$N_2$, 750° C., dwell time of 8 hours. |
| 6 | 0.4 $Li_2CO_3$<br>2.2 $LiH_2PO_4$<br>1 $V_2O_5$<br>0.8 Red phosphorus (0% excess reducing power) | $Li_3V_2(PO_4)_3$ (sample X0773, Cell #209046) | Mixing solvent: Acetone<br>$N_2$, 650° C., dwell time of 8 hours. |
| 7 | 0.12 $Li_2CO_3$<br>0.76 $LiH_2PO_4$<br>0.25 $Mn_2O_3$ | $LiMn_{0.5}Fe_{0.5}PO_4$ (sample X0703, Cell # 208031) | Mixing solvent: Acetone<br>$N_2$, 650° C., dwell time of 6 hours. |

TABLE 1-continued

| EXAMPLE | STARTING MATERIALS | TARGET PRODUCT | REACTION CONDITIONS |
|---|---|---|---|
| 8 | 0.25 $Fe_2O_3$<br>0.24 Red phosphorus (20% excess reducing power)<br>0.084 $Li_2CO_3$<br>0.832 $LiH_2PO_4$<br>0.25 $Mn_2O_3$<br>0.1 $Fe_2O_3$<br>0.3 $Mg(OH)_2$<br>0.168 Red phosphorus (20% excess reducing power)<br>0.875 C (added as a conductive additive) | $LiMn_{0.5}Fe_{0.2}Mg_{0.3}PO_4$<br>(sample X0771, Cell # 209045) | Mixing solvent: Acetone<br>$N_2$, 600° C., dwell time of 6 hours. |
| 9 | 1 $Na_4P_2O_7$<br>3 $FeC_2O_4 \cdot H_2O$<br>1.4 $NH_4H_2PO_4$<br>0.6 Red phosphorus<br>3.75 C (added as a conductive additive) | $Na_4Fe_3(PO_4)_2P_2O_7$<br>(sample X0761 Cell # 209030) | Mixing solvent: Acetone<br>$N_2$, 300° C., dwell time of 4 hours<br>$N_2$, 500° C., dwell time of 6 hours |
| 10 | 0.4 $Na_2CO_3$<br>2.2 $NaH_2PO_4$<br>1 $V_2O_5$<br>0.8 Red phosphorus (0% excess reducing power) | $Na_3V_2(PO_4)_3$<br>(sample X0757 Cell # 210042) | Mixing solvent: Acetone<br>$N_2$, 650° C., dwell time of 8 hours |
| 11 | 0.14 $Li_2CO_3$<br>0.72 $LiH_2PO_4$<br>0.55 $Fe_2O_3$<br>0.28 Red phosphorus (40% excess reducing power) | $LiFePO_4/Fe_2P$ Composite<br>(sample X0740 Cell # 209008) | Mixing solvent: Acetone<br>$N_2$, 650° C., dwell time of 6 hours |
| 12 | 0.5 $Li_2CO_3$<br>0.5 $Fe_2O_3$<br>1.0 Red phosphorus | $LiFePO_4$<br>(sample X1322 Cell #305086) | Mixing solvent: Acetone<br>Sealed in Air, dwell time of 4 hours |

The sources of the starting materials used in Examples 1 to 12 are listed in Table 2 below:

TABLE 2

| Chemical | Supplier | Order Code |
|---|---|---|
| $Li_2CO_3$ | Sigma Aldrich | 62470 |
| $FePO_4 \cdot 2H_2O$ | Sigma Aldrich | 436011 |
| Red P | Alfa Aesar | 10281 |
| $LiH_2PO_4$ | Alfa Aesar | A16987 |
| $Fe_2O_3$ | Alfa Aesar | 12375 |
| $Fe(C_2O_4) \cdot 2H_2O$ | Sigma Aldrich | 307726 |
| C | TIMCAL | Super P Li |
| $V_2O_5$ | Sigma Aldrich | 223794 |
| $Mn_2O_3$ | Alfa Aesar | 87791 |
| $Na_4P_2O_7$ | Sigma Aldrich | P8010 |
| $NH_4H_2PO_4$ | Sigma Aldrich | 216003 |
| $Na_2CO_3$ | Sigma Aldrich | 223530 |
| $NaH_2PO_4$ | Sigma Aldrich | S5011 |

Product Analysis using XRD

Analysis by X-ray diffraction techniques was conducted using a Siemens D5000 powder diffractometer to confirm that the desired target materials had been prepared, to establish the phase purity of the product material and to determine the types of impurities present. From this information it is possible to determine the unit cell lattice parameters.

The general XRD operating conditions used to analyse the precursor electrode materials from Examples 1 to 10 are as follows:

Slits sizes: 1 mm, 1 mm, 0.1 mm
Range: 2θ=5°-60°
X-ray Wavelength=1.5418 Å (Cu Kα)
Speed: 1.0 second/step
Increment: 0.025°/step The XRD operating conditions used to analyse the precursor electrode material from Example 11 are as follows:

Slits sizes: 1 mm, 1 mm, 0.1 mm
Range: 2θ=30°-60°
X-ray Wavelength=1.5418 Å (Cu Kα)
Speed: 8.0 second/step
Increment: 0.015°/step The XRD operating conditions used to analyse the precursor electrode material from Example 12 are as follows:

Slits sizes: 1 mm, 1 mm, 0.1 mm
Range: 2θ=10°-60°
X-ray Wavelength=1.5418 Å (Cu Kα)
Speed: 8.0 second/step
Increment: 0.015°/step Electrochemical Results The target materials were tested in a metallic lithium half cell which can be made using the following procedure:

Generic Procedure to Make a Lithium Metal Electrochemical Test Cell

The positive electrode is prepared by solvent-casting a slurry of the active material, conductive carbon, binder and solvent. The conductive carbon used is Super P (Timcal). PVdF co-polymer (e.g. Kynar Flex 2801, Elf Atochem Inc.) is used as the binder, and acetone is employed as the solvent. The slurry is then cast onto glass and a free-standing electrode film is formed as the solvent evaporates. The electrode is then dried further at about 80° C. The electrode film contains the following components, expressed in percent by weight: 80% active material, 8% Super P carbon, and 12% Kynar 2801 binder. Optionally, an aluminium current collector may be used to contact the positive electrode. Metallic lithium on a copper current collector may be employed as the negative electrode. The electrolyte comprises one of the following: (i) a 1 M solution of LiPF$_6$ in ethylene carbonate (EC) and dimethyl carbonate (DMC) in a weight ratio of 1:1; (ii) a 1 M solution of LiPF$_6$ in ethylene carbonate (EC) and diethyl carbonate (DEC) in a weight ratio of 1:1; or (iii) a 1 M solution of LiPF$_6$ in propylene carbonate (PC) A glass fibre separator (VVhatman, GF/A) or a porous polypropylene separator (e.g. Celgard 2400) wetted by the electrolyte is interposed between the positive and negative electrodes.

Cell Testing

The cells are tested as follows, using Constant Current Cycling techniques. The cell is cycled at a given current density between pre-set voltage limits. A commercial battery cycler from Maccor Inc. (Tulsa, Olka., USA) is used. On charge, sodium (lithium)-ions are extracted from the cathode active material. During discharge, lithium (sodium)-ions are re-inserted into the cathode active material.

EXAMPLE 1

Figure 1B:
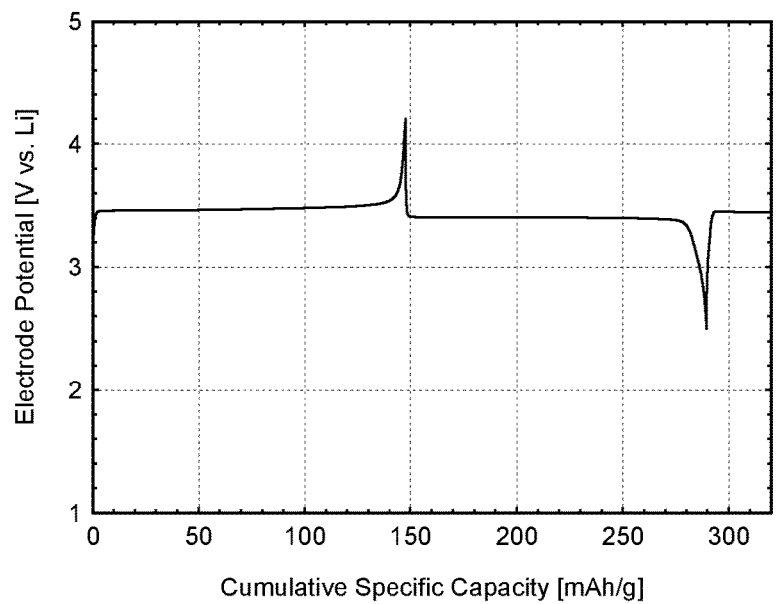
FIG. 1B shows the voltage profile (electrode potential versus cumulative specific io capacity) for $LiFePO_4$ active material produced according to Example 1 of the present invention.
Figure 1C:
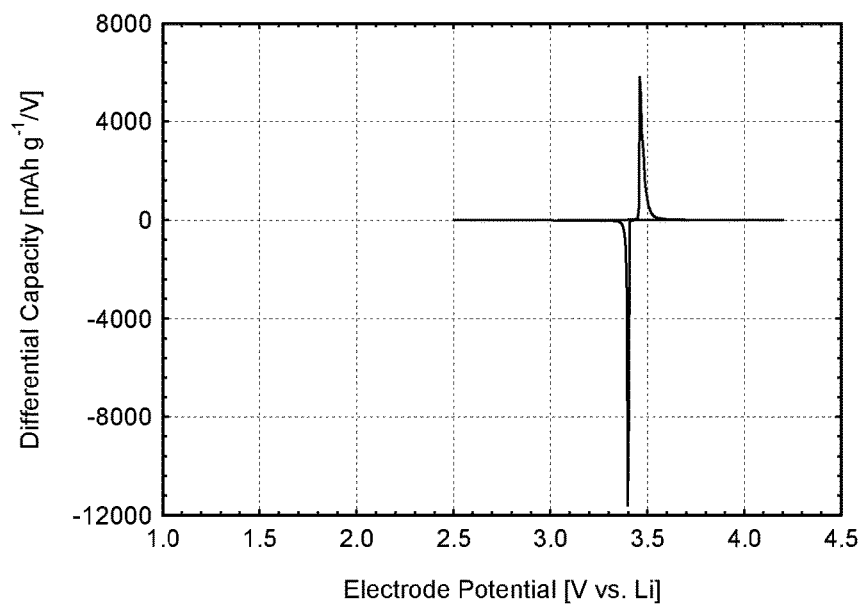
FIG. 1C shows the differential capacity profile (differential capacity versus electrode potential) for $LiFePO_4$ active material produced according to Example 1 of the present invention.

FIGS. 1B and C (Cell#210021) show the first cycle constant current data for the LiFePO$_4$ cathode active material (X0851, made using anhydrous FePO$_4$ and Red P) measured in a metallic lithium half-cell. Specifically, FIG. 1B shows the voltage profile (electrode potential versus cumulative specific capacity) and FIG. 1O shows the differential capacity profile (differential capacity versus electrode potential). The constant current data shown in the figure were collected using a lithium metal counter electrode at a current density of 0.04 mA/cm$^2$ between voltage limits of 2.5 and 4.2 V. The non-aqueous electrolyte used was a 1 M solution of LiPF$_6$ in a 1:1 mixture of ethylene carbonate (EC) and diethyl carbonate (DEC). The electrochemical testing was carried out at a controlled temperature of 25° C.

The Open Circuit Voltage (OCV) of the as-made cell was 3.029 V vs. Li. Referring to FIG. 1B, during the first lithium extraction process, a charge equivalent to a material specific capacity of 147 mAh/g was obtained for the cathode active material. The subsequent re-insertion process corresponded to material specific capacity of 142 mAh/g, indicating the general reversibility of the lithium-ion insertion reactions.

The symmetrical nature of the charge-discharge voltage profile indicates the excellent reversibility of the system. This is further exemplified by the symmetrical nature of the differential capacity profile shown in FIG. 1O.

EXAMPLE 2

Figure 2A:
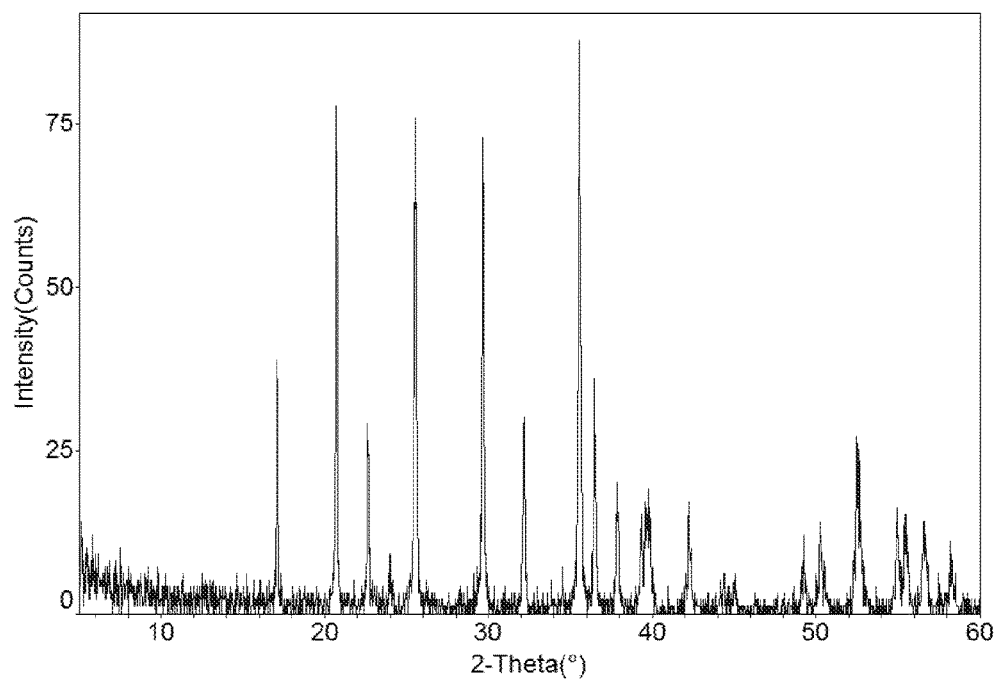
FIG. 2A is an XRD profile for $LiFePO_4$ active material produced according to Example 2 of the present invention.
Figure 2B:
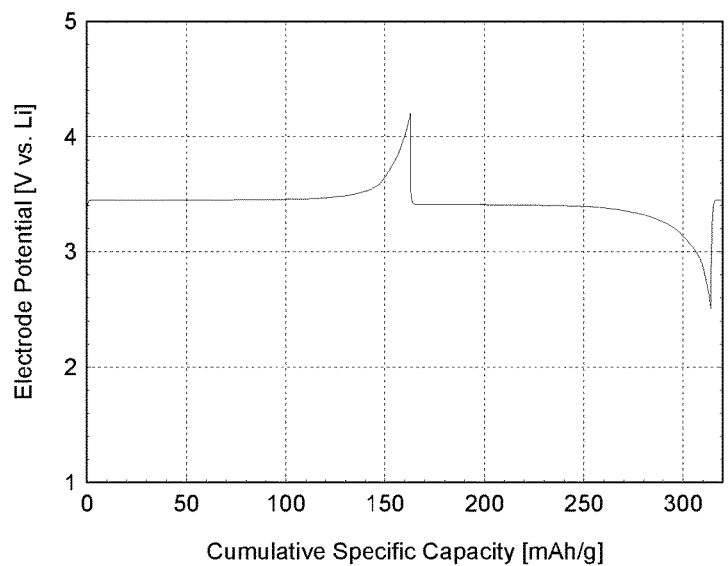
FIG. 2B shows the voltage profile (electrode potential versus cumulative specific capacity) for $LiFePO_4$ active material produced according to Example 2 of the present invention.
Figure 2C:
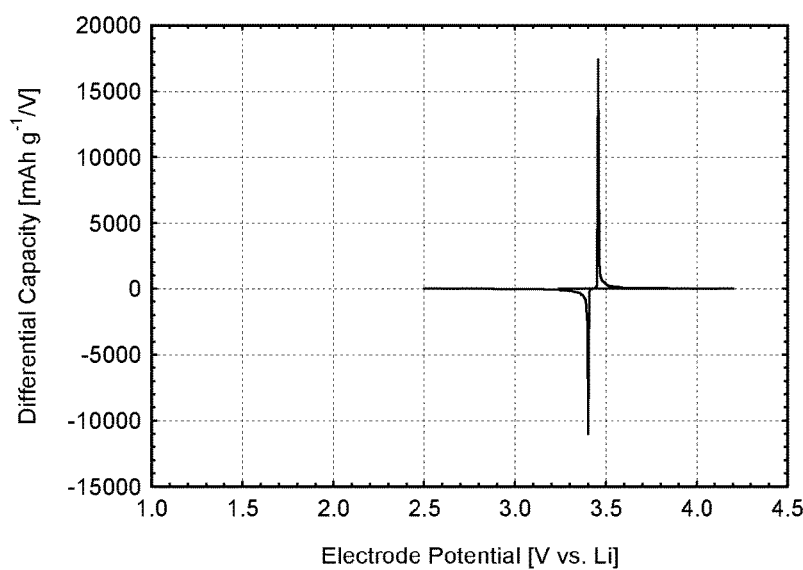
FIG. 2C shows the differential capacity profile (differential capacity versus electrode potential) for $LiFePO_4$ active material produced according to Example 2 of the present invention.

FIGS. 2B and C (Cell#209052) show the first cycle constant current data for the LiFePO$_4$ cathode active material (X0776, made using Fe$_2$O$_3$ and Red P) measured in a metallic lithium half-cell. FIG. 2B shows the voltage profile (electrode potential versus cumulative specific capacity) and FIG. 2C shows the differential capacity profile (differential capacity versus electrode potential). The constant current data shown in the figure were collected using a lithium metal counter electrode at a current density of 0.04 mA/cm$^2$ between voltage limits of 2.5 and 4.2 V. The non-aqueous electrolyte used was a 1 M solution of LiPF$_6$ in a 1:1 mixture of ethylene carbonate (EC) and diethyl carbonate (DEC). The electrochemical testing was carried out at a controlled temperature of 25° C.

The Open Circuit Voltage (OCV) of the as-made cell was 3.231 V vs. Li. Referring to FIG. 2B, during the first lithium extraction process, a charge equivalent to a material specific capacity of 155 mAh/g was obtained for the cathode active material. The subsequent re-insertion process corresponded to material specific capacity of 145 mAh/g, indicating the general reversibility of the lithium-ion insertion reactions.

The symmetrical nature of the charge-discharge voltage profile indicates the excellent reversibility of the system. This is further exemplified by the symmetrical nature of the differential capacity profile shown in FIG. 2C.

EXAMPLE 3

Figure 3A:
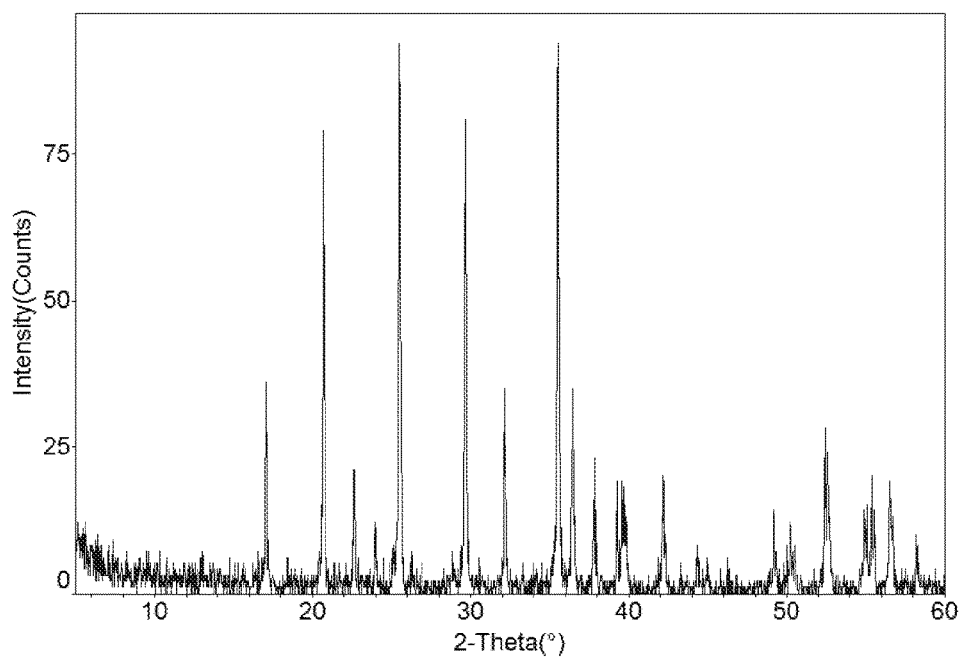
FIG. 3A is an XRD profile for $LiFePO_4$ active material produced according to Example 3 of the present invention.
Figure 3B:
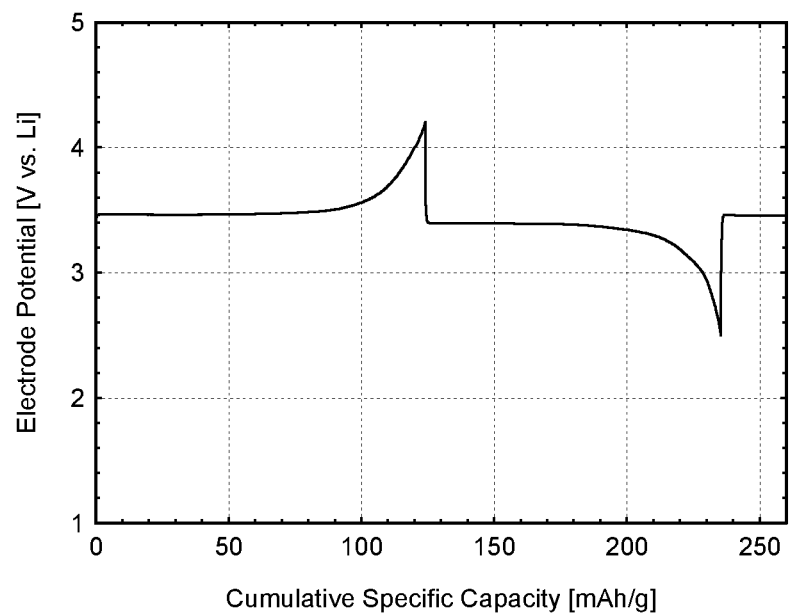
FIG. 3B shows the voltage profile (electrode potential versus cumulative specific capacity) for $LiFePO_4$ active material produced according to Example 3 of the present invention.
Figure 3C:
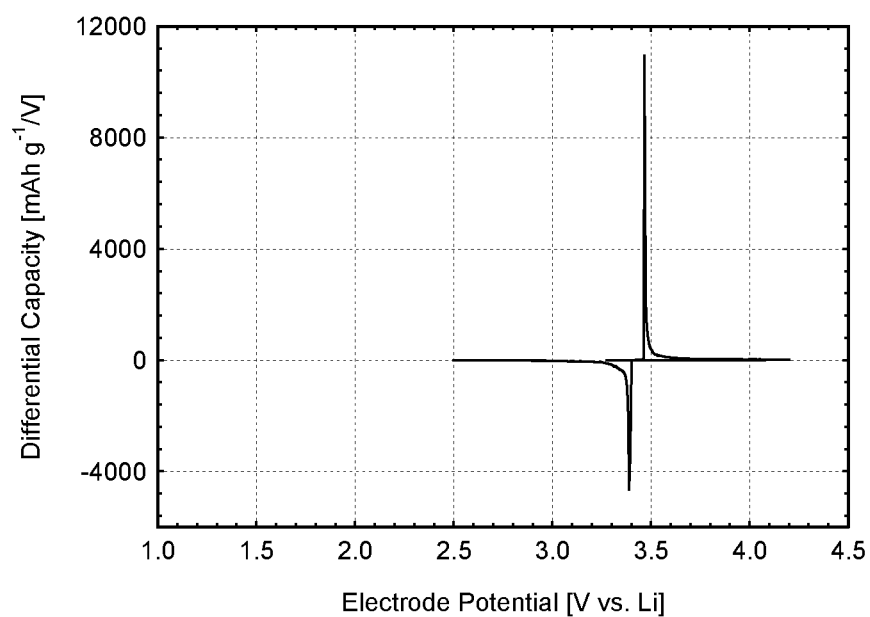
FIG. 3C shows the differential capacity profile (differential capacity versus electrode potential) for $LiFePO_4$ active material produced according to Example 3 of the present invention.

FIGS. 3B and C (Cell#208052) show the first cycle constant current data for the LiFePO$_4$ cathode active material (X0686, made using Fe$_2$O$_3$ and Red P) measured in a metallic lithium half-cell. In this test the electrode formulation contained no carbon io additive to improve electronic conductivity. FIG. 3B shows the voltage profile (electrode potential versus cumulative specific capacity) and FIG. 3C shows the differential capacity profile (differential capacity versus electrode potential). The constant current data shown in the figure were collected using a lithium metal counter electrode at a current density of 0.04 mA/cm$^2$ between voltage limits of 2.5 and 4.2 V. The non-aqueous electrolyte used was a 1 M solution of LiPF$_6$ in a 1:1 mixture of ethylene carbonate (EC) and diethyl carbonate (DEC). The electrochemical testing was carried out at a controlled temperature of 25° C.

The Open Circuit Voltage (OCV) of the as-made cell was 3.259 V vs. Li. Referring to FIG. 3B, during the first lithium extraction process, a charge equivalent to a material specific capacity of 124 mAh/g was obtained for the cathode active material. The subsequent re-insertion process corresponded to material specific capacity of 111 mAh/g, thus indicating the general reversibility of the lithium-ion insertion reactions. This material performance derived from an electrode with no conductive additive is surprisingly good.

The symmetrical nature of the charge-discharge voltage profile indicates the excellent reversibility of the system. This is further exemplified by the symmetrical nature of the differential capacity profile shown in FIG. 3C.

EXAMPLE 4 (COMPARATIVE)

Figure 4A:
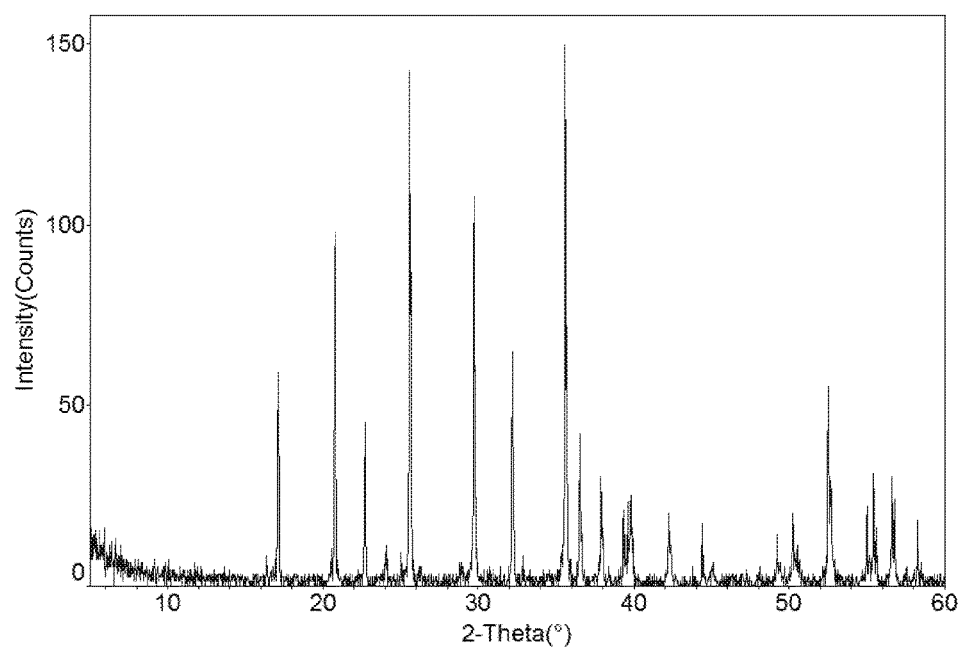
FIG. 4A is an XRD profile for $LiFePO_4$ active material produced according to comparative Example 4.
Figure 4B:
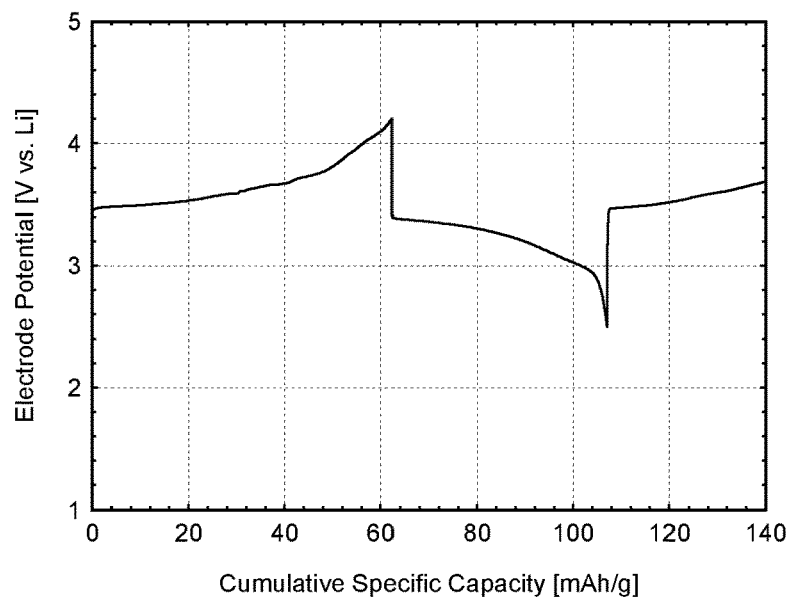
FIG. 4B shows the voltage profile (electrode potential versus cumulative specific capacity) for $LiFePO_4$ active material produced according to comparative Example 4.
Figure 4C:
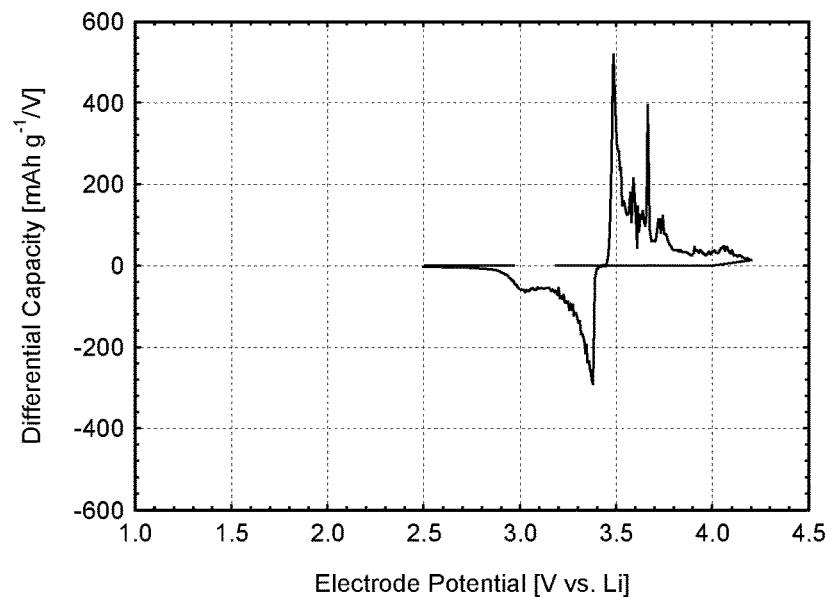
FIG. 4C shows the differential capacity profile (differential capacity versus electrode potential) for $LiFePO_4$ active material produced according to comparative io Example 4.

FIGS. 4B and C (Cell#207072) show the first cycle constant current data for the LiFePO$_4$ cathode active material (X0650, made using iron oxalate, Fe(C$_2$O$_4$).2H$_2$O—an Fe$^{2+}$ precursor that requires no reducing agent) measured in a metallic lithium half-cell. FIG. 4B shows the voltage profile (electrode potential versus cumulative specific capacity) and FIG. 4C shows the differential capacity profile (differential capacity versus electrode potential). The constant current data shown in the figure were collected using a lithium metal counter electrode at a current density of 0.04 mA/cm$^2$ between voltage limits of 2.5 and 4.2 V. The non-aqueous electrolyte used was a 1 M solution of LiPF$_6$ in a 1:1 mixture of ethylene carbonate (EC) and diethyl carbonate (DEC). The electrochemical testing was carried out at a controlled temperature of 25° C.

The Open Circuit Voltage (OCV) of the as-made cell was 3.177 V vs. Li. Referring to FIG. 4B, during the first lithium extraction process, a charge equivalent to a material specific capacity of 63 mAh/g was obtained for the cathode active material. This is a relatively low material utilization. The subsequent re-insertion process corresponded to material specific capacity of 45 mAh/g indicating the relatively poor reversibility. FIG. 4C shows the corresponding differential capacity profile for this material which is indistinct and noisy indicating the poor electrochemical reversibility of the active material.

EXAMPLE 5 (COMPARATIVE)

Figure 5A:
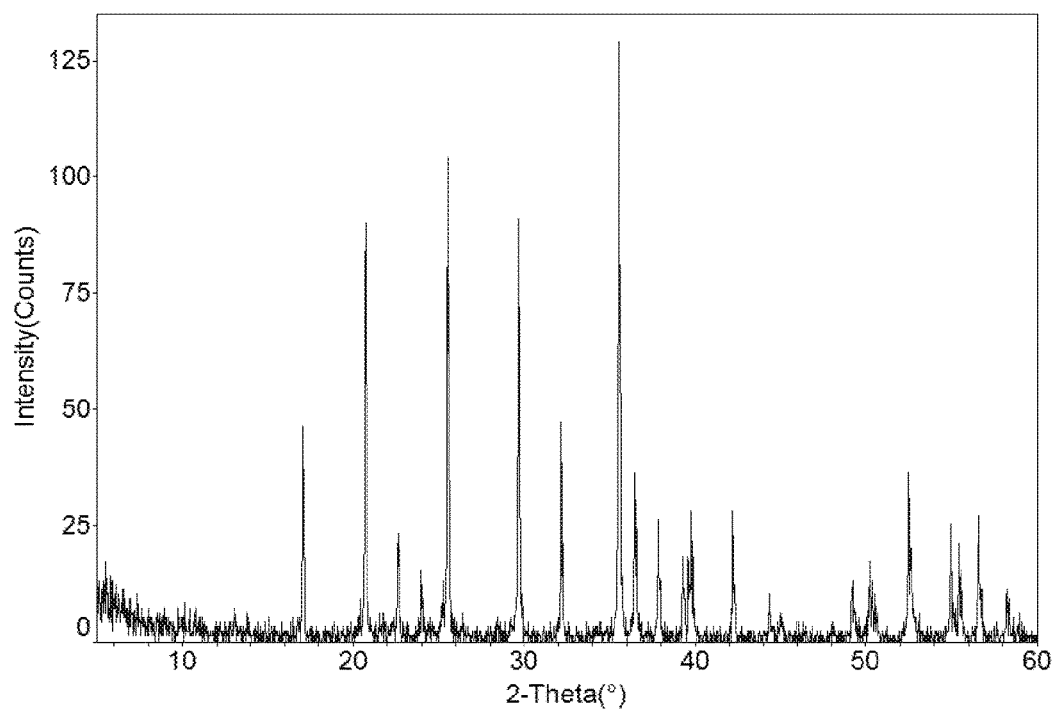
FIG. 5A is an XRD profile for $LiFePO_4$ active material produced according to comparative Example 5.
Figure 5B:
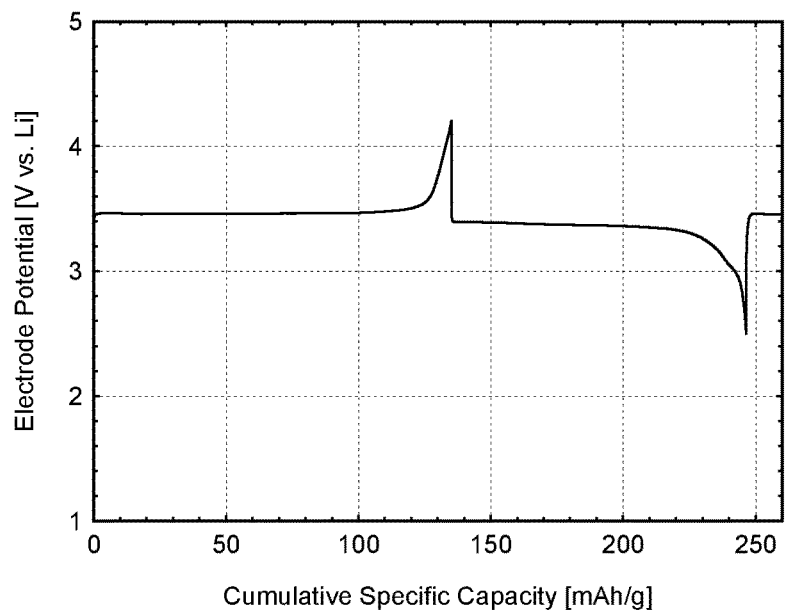
FIG. 5B shows the voltage profile (electrode potential versus cumulative specific capacity) for $LiFePO_4$ active material produced according to Example 5.
Figure 5C:
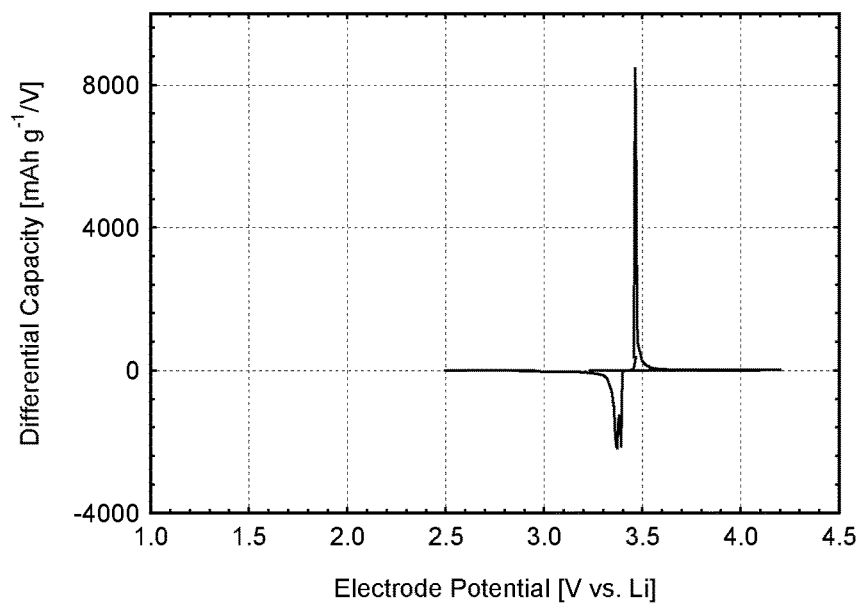
FIG. 5C shows the differential capacity profile (differential capacity versus electrode potential) for $LiFePO_4$ active material produced according to comparative Example 5.

FIGS. 5B and C (Cell#207071) show the first cycle constant current data for the LiFePO$_4$ cathode active material (X0649, made using Fe$_2$O$_3$ by carbothermal reduction using Super P Carbon (Timcal) as the reducing agent and conductivity enhancer) measured in a metallic lithium half-cell. FIG. 5B shows the voltage profile (electrode potential versus cumulative specific capacity) and FIG. 5C shows the differential capacity profile (differential capacity versus electrode potential). The constant current data shown in the figure were collected using a lithium metal counter electrode at a current density of 0.04 mA/cm$^2$ between voltage limits of 2.5 and 4.2 V. The non-aqueous electrolyte used was a 1 M solution of LiPF$_6$ in a 1:1 mixture of ethylene carbonate (EC) and diethyl carbonate (DEC). The electrochemical testing was carried out at a controlled temperature of 25° C.

The Open Circuit Voltage (OCV) of the as-made cell was 3.177 V vs. Li. Referring to FIG. 5B, during the first lithium extraction process, a charge equivalent to a material specific capacity of 135 mAh/g was obtained for the cathode active material. The subsequent re-insertion process corresponded to material specific capacity of 111 mAh/g indicating good reversibility.

The symmetrical nature of the charge-discharge voltage profile further indicates the reversibility of the system. This is further exemplified by the symmetrical nature of the differential capacity profile shown in FIG. 5C.

EXAMPLE 6

Figure 6A:
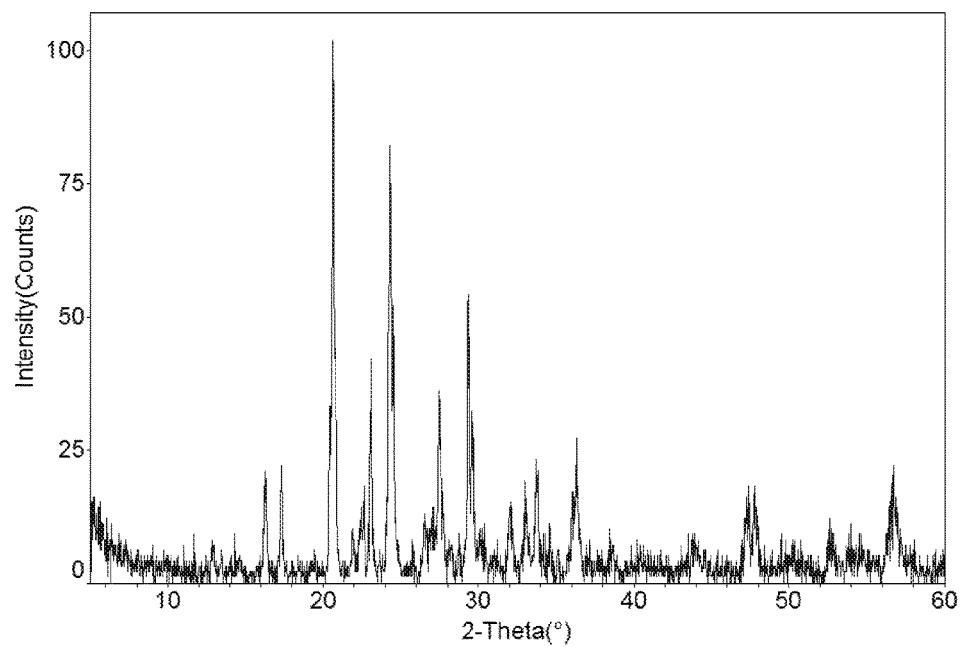
FIG. 6A is an XRD profile for $Li_3V_2(PO_4)_3$ active material produced according to Example 6 of the present invention.
Figure 6B:
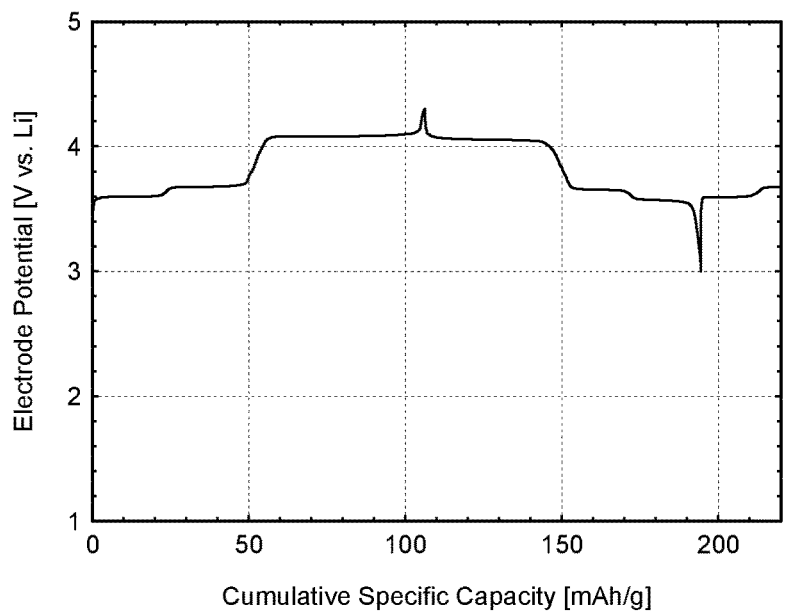
FIG. 6B shows the voltage profile (electrode potential versus cumulative specific capacity) for $Li_3V_2(PO_4)_3$ active material produced according to Example 6 of the present invention.
Figure 6C:
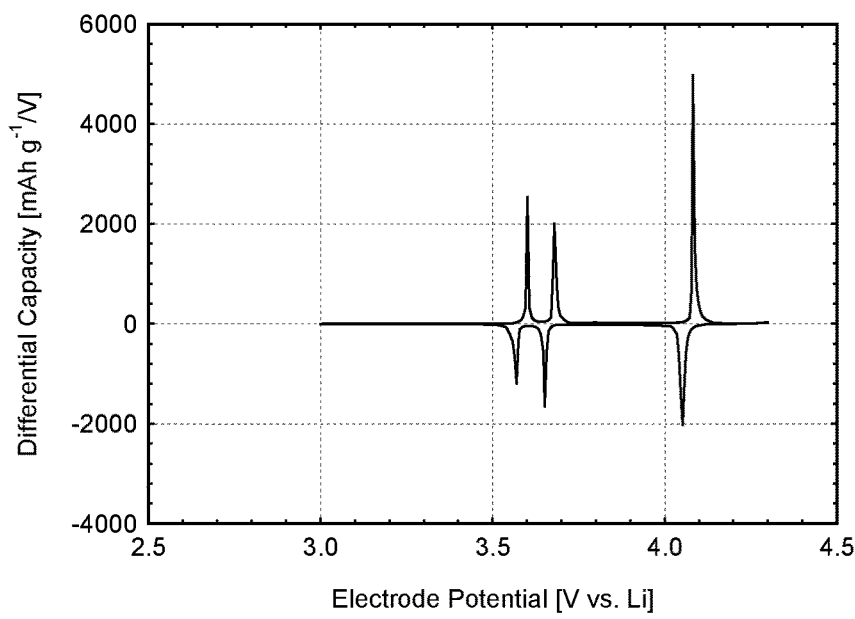
FIG. 6C shows the differential capacity profile (differential capacity versus electrode potential) for $Li_3V_2(PO_4)_3$ active material produced according to Example 6 of the present invention.

FIGS. 6B and C (Cell#209046) show the first cycle constant current data for the Li$_3$V$_2$(PO$_4$)$_3$ cathode active material (X0773, made using V$_2$O$_5$ and Red P) measured in a metallic lithium half-cell. Specifically, FIG. 6B shows the voltage profile (electrode potential versus cumulative specific capacity) and FIG. 6C shows the differential capacity profile (differential capacity versus electrode potential). The constant current data shown in the figure were collected using a lithium metal counter electrode at a current density of 0.04 mA/cm$^2$ between voltage limits of 3.0 and 4.2 V. The non-aqueous electrolyte used was a 1 M solution of LiPF$_6$ in a 1:1 mixture of ethylene carbonate (EC) and diethyl carbonate (DEC). The electrochemical testing was carried out at a controlled temperature of 25° C.

The Open Circuit Voltage (OCV) of the as-made cell was 3.286 V vs. Li. Referring to FIG. 6B, during the first lithium extraction process, a charge equivalent to a material specific capacity of 107 mAh/g was obtained for the cathode active material. The subsequent re-insertion process corresponded to material specific capacity of 92 mAh/g, indicating the general reversibility of the lithium-ion insertion reactions.

The symmetrical nature of the charge-discharge voltage profile indicates the excellent reversibility of the system. This is further exemplified by the symmetrical nature of the differential capacity profile shown in FIG. 6C.

EXAMPLE 7

Figure 7A:
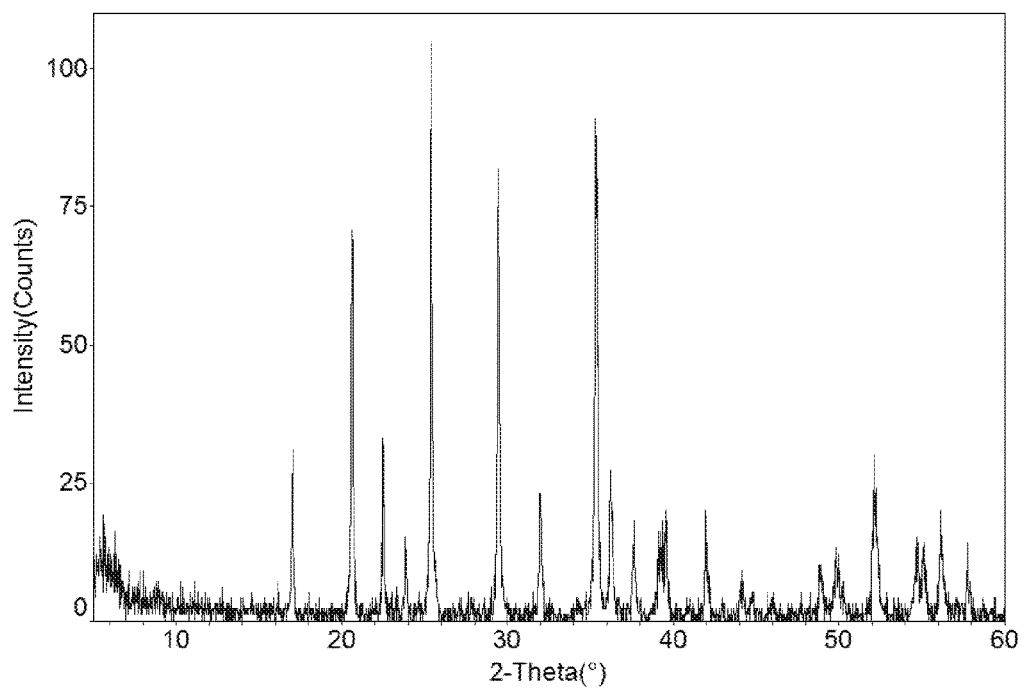
FIG. 7A is an XRD profile for $LiMn_{0.5}Fe_{0.5}PO_4$ active material produced according to Example 7 of the present invention.
Figure 7B:
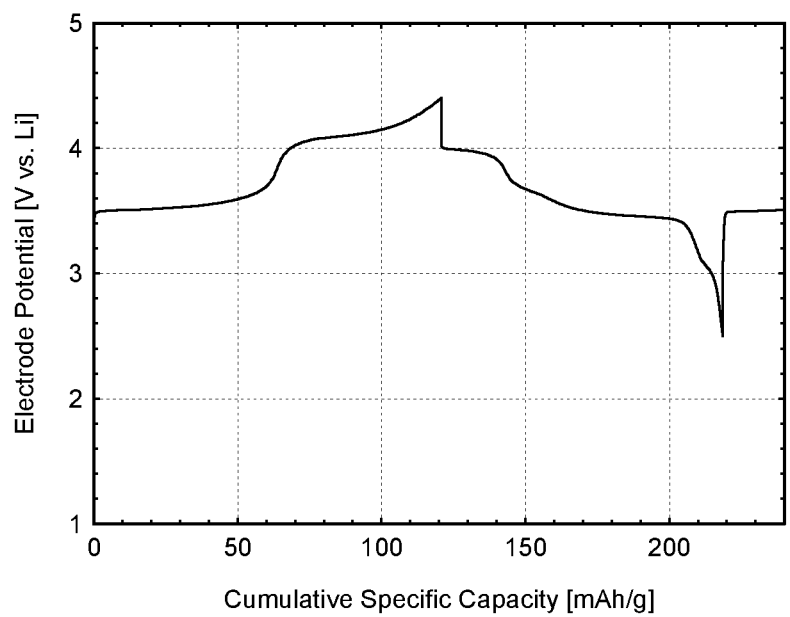
FIG. 7B shows the voltage profile (electrode potential versus cumulative specific capacity) for $LiMn_{0.5}Fe_{0.5}PO_4$ active material produced according to Example 7 of the present invention.
Figure 7C:
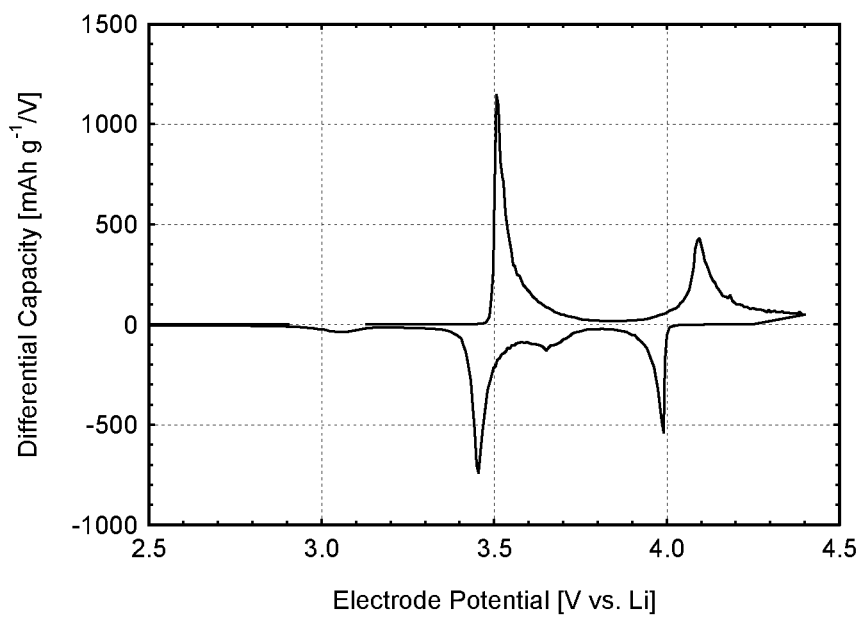
FIG. 7C shows the differential capacity profile (differential capacity versus electrode potential) for $LiMn_{0.5}Fe_{0.5}PO_4$ active material produced according to Example 7 of the present invention.

FIGS. 7B and C (Cell#208031) show the first cycle constant current data for the LiFe$_{0.5}$Mn$_{0.5}$PO$_4$ cathode active material (X0703, made using Fe$_2$O$_3$, Mn$_2$O$_3$ and Red P) measured in a metallic lithium half-cell. Specifically, FIG. 7B shows the voltage profile (electrode potential versus cumulative specific capacity) and FIG. 7C shows the differential capacity profile (differential capacity versus electrode potential). The constant current data shown in the figure were collected using a lithium metal counter electrode at a current density of 0.04 mA/cm$^2$ between voltage limits of 2.5 and 4.4 V.

The non-aqueous electrolyte used was a 1 M solution of LiPF$_6$ in a 1:1 mixture of ethylene carbonate (EC) and diethyl carbonate (DEC). The electrochemical testing was carried out at a controlled temperature of 25° C.

The Open Circuit Voltage (OCV) of the as-made cell was 3.114 V vs. Li. Referring to FIG. 7B, during the first lithium extraction process, a charge equivalent to a material specific capacity of 121 mAh/g was obtained for the cathode active material. The subsequent re-insertion process corresponded to material specific capacity of 98 mAh/g, indicating the general reversibility of the lithium-ion insertion reactions.

The symmetrical nature of the charge-discharge voltage profile indicates the excellent reversibility of the system. This is further exemplified by the symmetrical nature of the differential capacity profile shown in FIG. 7C.

EXAMPLE 8

Figure 8A:
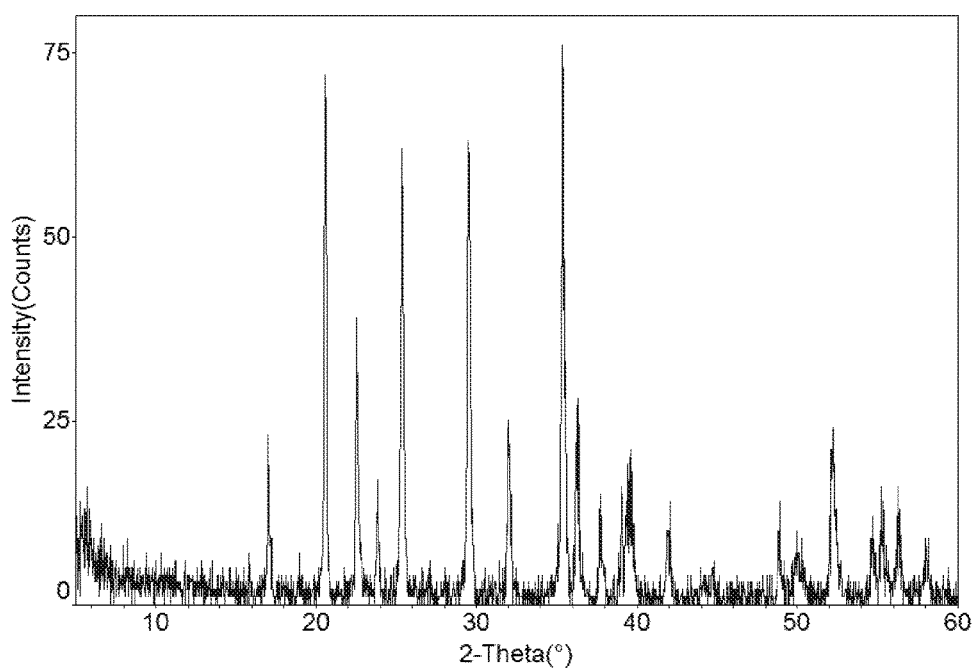
FIG. 8A is an XRD profile for $LiMn_{0.5}Fe_{0.2}Mg_{0.3}PO_4$ active material produced according to Example 8 of the present invention.
Figure 8B:
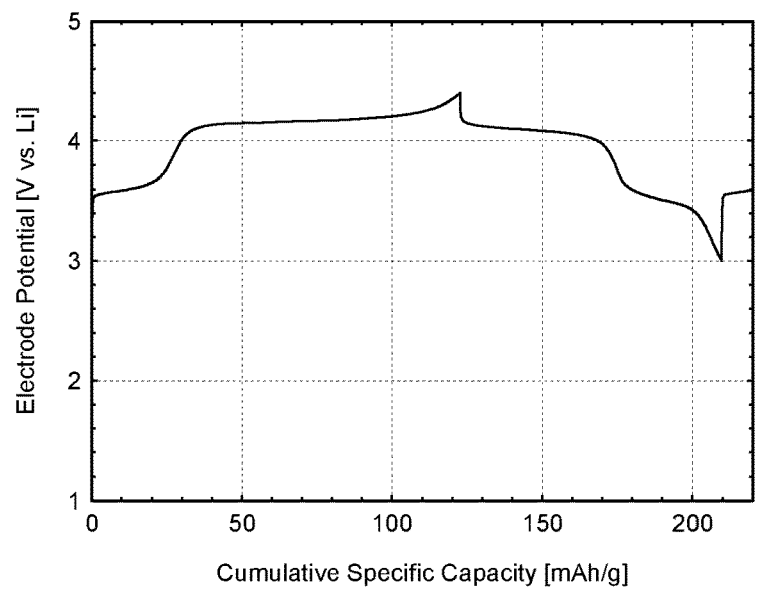
FIG. 8B shows the voltage profile (electrode potential versus cumulative specific capacity) for $LiMn_{0.5}Fe_{0.2}Mg_{0.3}PO_4$ active material produced according to Example 8 of the present invention.
Figure 8C:
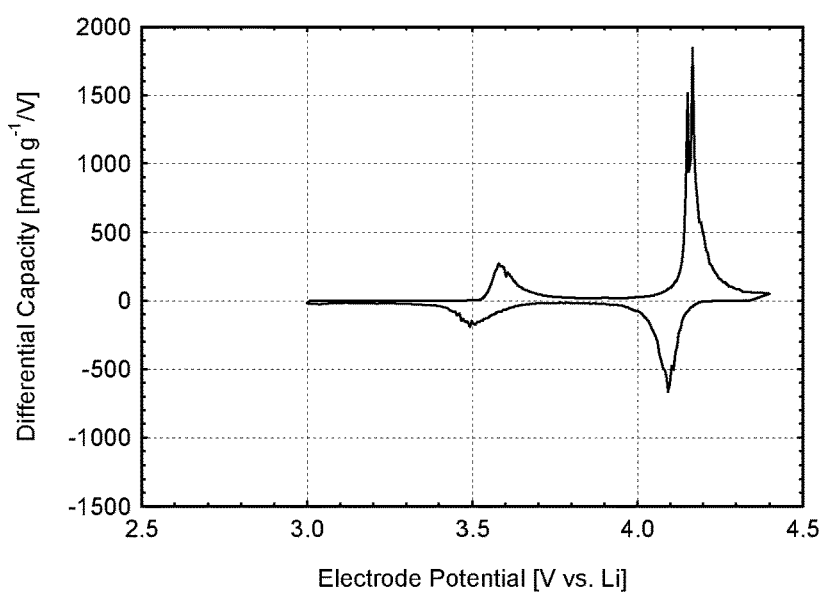
FIG. 8C shows the differential capacity profile (differential capacity versus electrode potential) for $LiMn_{0.5}Fe_{0.2}Mg_{0.3}PO_4$ active material produced according to Example 8 of the present invention.

FIGS. 8B and C (Cell#209045) show the first cycle constant current data for the LiMn$_{0.5}$Fe$_{0.2}$Mg$_{0.3}$PO$_4$ cathode active material (X0771, made using Fe$_2$O$_3$, Mn$_2$O$_3$ and Red P) measured in a metallic lithium half-cell. FIG. 8B shows the voltage profile (electrode potential versus cumulative specific capacity) and FIG. 8C shows the differential capacity profile (differential capacity versus electrode potential). The constant current data shown in the figure were collected using a lithium metal counter electrode at a current density of 0.04 mA/cm$^2$ between voltage limits of 3.0 and 4.4 V. The non-aqueous electrolyte used was a 1 M solution of LiPF$_6$ in a 1:1 mixture of ethylene carbonate (EC) and diethyl carbonate (DEC). The electrochemical testing was carried out at a controlled temperature of 25° C.

The Open Circuit Voltage (OCV) of the as-made cell was 3.042 V vs. Li. Referring to FIG. 8B, during the first lithium extraction process, a charge equivalent to a material specific capacity of 122 mAh/g was obtained for the cathode active material. The subsequent re-insertion process corresponded to material specific capacity of 87 mAh/g, indicating the general reversibility of the lithium-ion insertion reactions.

The symmetrical nature of the charge-discharge voltage profile indicates the excellent reversibility of the system. This is further exemplified by the symmetrical nature of the differential capacity profile shown in FIG. 8C.

EXAMPLE 9

Figure 9A:
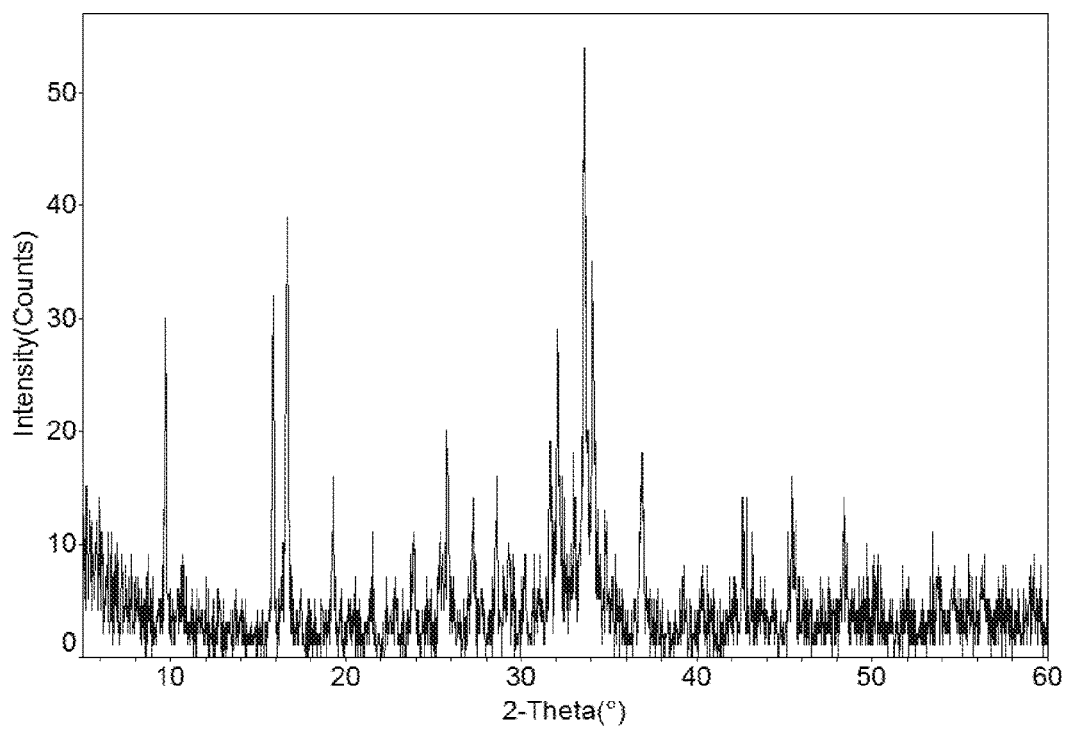
FIG. 9A is an XRD profile for $Na_4Fe_3(PO_4)_2P_2O_7$ active material produced according to Example 9 of the present invention.
Figure 9B:
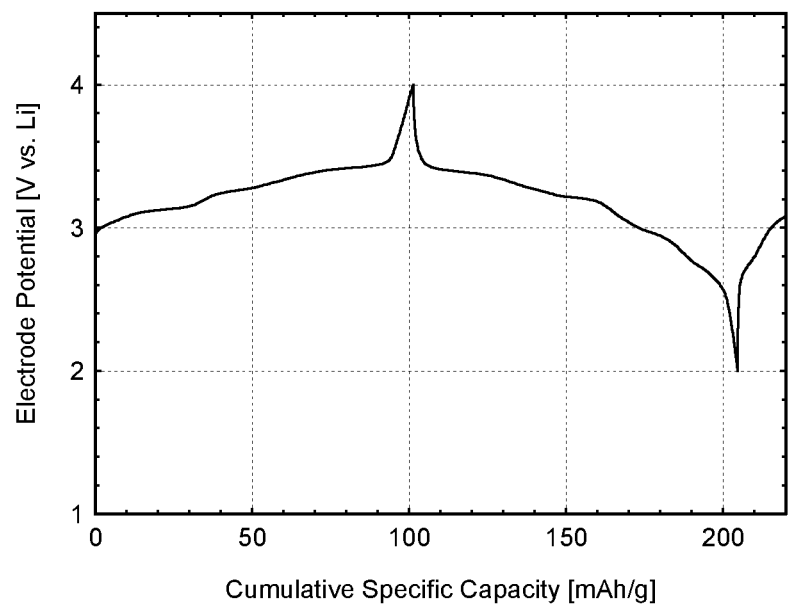
FIG. 9B shows the voltage profile (electrode potential versus cumulative specific capacity) for $Na_4Fe_3(PO_4)_2P_2O_7$ active material produced according to Example 9 of the present invention.
Figure 9C:
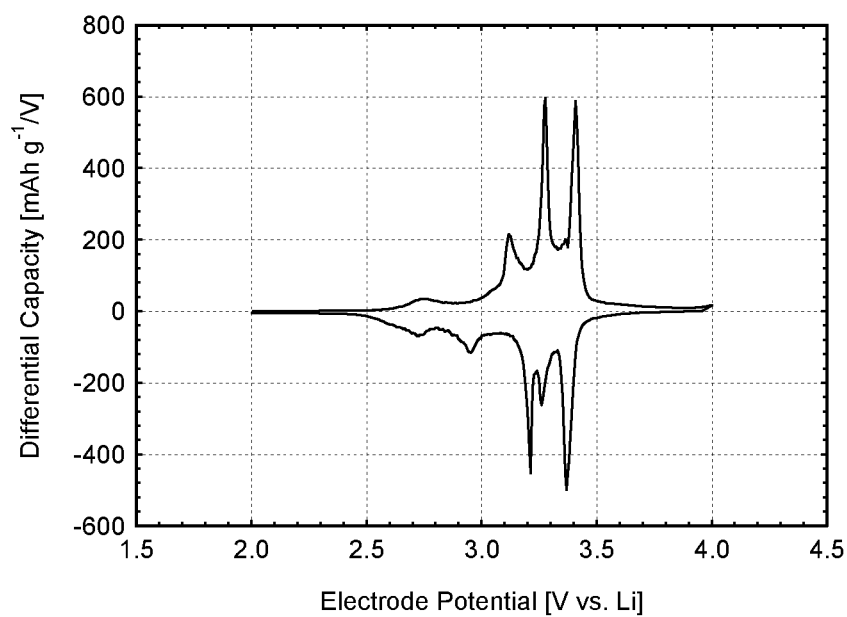
FIG. 9C shows the differential capacity profile (differential capacity versus electrode potential) for $Na_4Fe_3(PO_4)_2P_2O_7$ active material produced according to Example 9 of the present invention.

FIGS. 9B and C show the first cycle constant current data for the Na$_4$Fe$_3$(PO$_4$)$_2$P$_2$O$_7$ cathode active material (X0761, made using Fe$_2$O$_3$ and Red P) measured in a metallic lithium half-cell. Specifically, FIG. 9B shows the voltage profile (electrode potential versus cumulative specific capacity) and FIG. 9C shows the differential capacity profile (differential capacity versus electrode potential). The constant current data were collected using a lithium metal counter electrode at a current density of 0.04 mA/cm$^2$ between voltage limits of 2.0 and 4.0 V. The electrolyte used was 1 M solution of LiPF$_6$ in a 1:1 mixture of ethylene carbonate (EC) and diethyl carbonate (DEC). The testing was carried out at 25° C.

The Open Circuit Voltage (OCV) of the as-made cell was 2.889 V vs. Li. Referring to FIG. 9B, it is assumed that sodium ions are extracted from the active material during the initial charging of the cell. During the sodium ion extraction process, a charge equivalent to a material specific capacity of 102 mAh/g was obtained for the cathode active material. It is expected from thermodynamic considerations that the sodium extracted from the $Na_4Fe_3(PO_4)_2P_2O_7$ material during the initial charging process, enters the electrolyte, and is then displacement 'plated' onto the lithium metal anode (i.e. releasing more lithium into the electrolyte). Therefore, during the subsequent discharging of the cell, it is assumed that a mix of lithium and sodium is re-inserted into the material. The re-insertion process corresponds to 104 mAh/g, indicating the reversibility of the ion insertion reactions.

The symmetrical nature of the charge-discharge curves further indicates the excellent reversibility of the system. This is further exemplified by the symmetrical nature of the differential capacity profile (for cycle #2) shown in FIG. 9C.

EXAMPLE 10

Figure 10A:
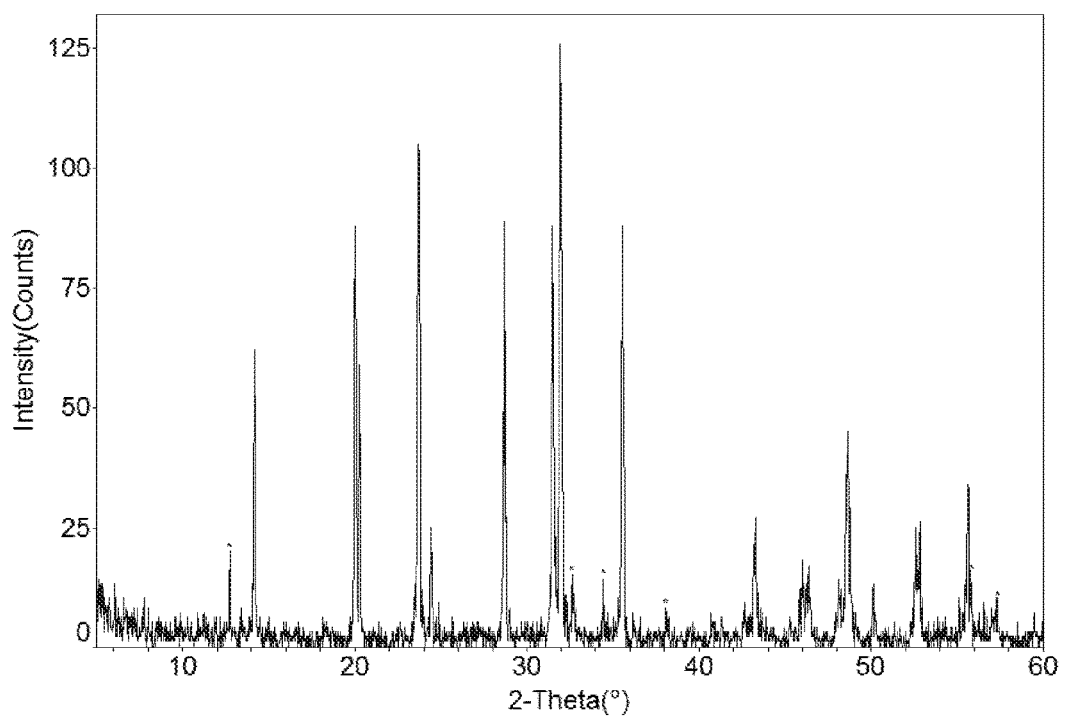
FIG. 10A is an XRD profile for $Na_3V_2(PO_4)_3$ active material produced according to Example 10 of the present invention (asterisks denote peaks due to $Na_3V(PO_4)_2$ impurity)
Figure 10B:
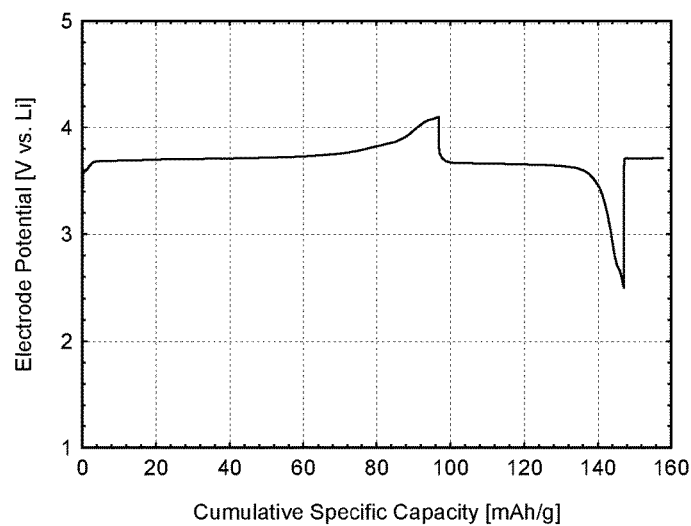
FIG. 10B shows the voltage profile (electrode potential versus cumulative specific capacity) for $Na_3V_2(PO_4)_3$ active material produced according to Example 10 of the present invention.
Figure 10C:
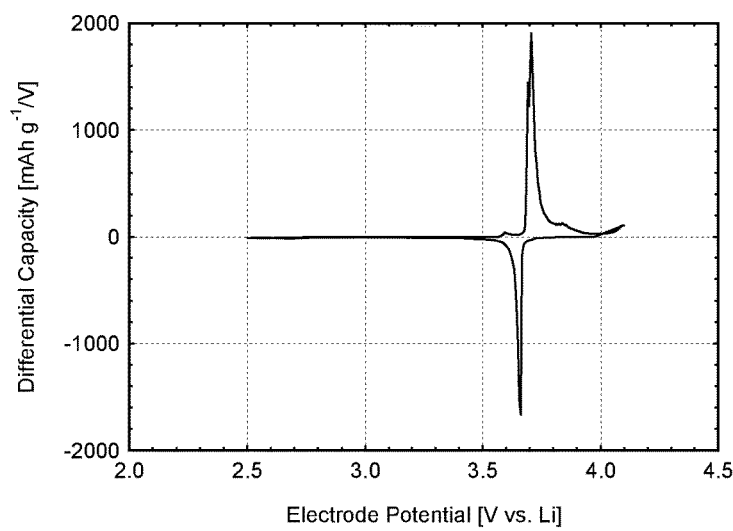
FIG. 10C shows the differential capacity profile (differential capacity versus electrode potential) for $Na_3V_2(PO_4)_3$ active material produced according to Example 10 of the present invention.

FIGS. 10B and C show the first cycle constant current data for the $Na_3V_2(PO_4)_3$ cathode active material (X0757, made using $V_2O_5$ and Red P) measured in a metallic lithium half-cell. Specifically, FIG. 10B shows the voltage profile (electrode potential versus cumulative specific capacity) and FIG. 10C shows the differential capacity profile (differential capacity versus electrode potential). The constant current data were collected using a lithium metal counter electrode at a current density of 0.04 mA/cm$^2$ between voltage limits of 2.5 and 4.1 V. The electrolyte used was 1 M solution of $LiPF_6$ in a 1:1 mixture of ethylene carbonate (EC) and diethyl carbonate (DEC). The testing was carried out at 25° C.

The Open Circuit Voltage (OCV) of the as-made cell was 2.719 V vs. Li. Referring to FIG. 10B, it is assumed that sodium ions are extracted from the active material during the initial charging of the cell. During the sodium ion extraction process, a charge equivalent to a material specific capacity of 97 mAh/g was obtained for the cathode active material. It is expected from thermodynamic considerations that the sodium extracted from the $Na_3V_2(PO_4)_3$ material during the initial charging process, enters the electrolyte, and is then displacement 'plated' onto the lithium metal anode (i.e. releasing more lithium into the electrolyte). Therefore, during the subsequent discharging of the cell, it is assumed that a mix of lithium and sodium is re-inserted into the material. The re-insertion process corresponds to 50 mAh/g, indicating the reversibility of the ion insertion reactions.

The symmetrical nature of the charge-discharge curves further indicates the excellent reversibility of the system. This is further exemplified by the symmetrical nature of the differential capacity profile shown in FIG. 10C.

EXAMPLE 11

Figure 11A:
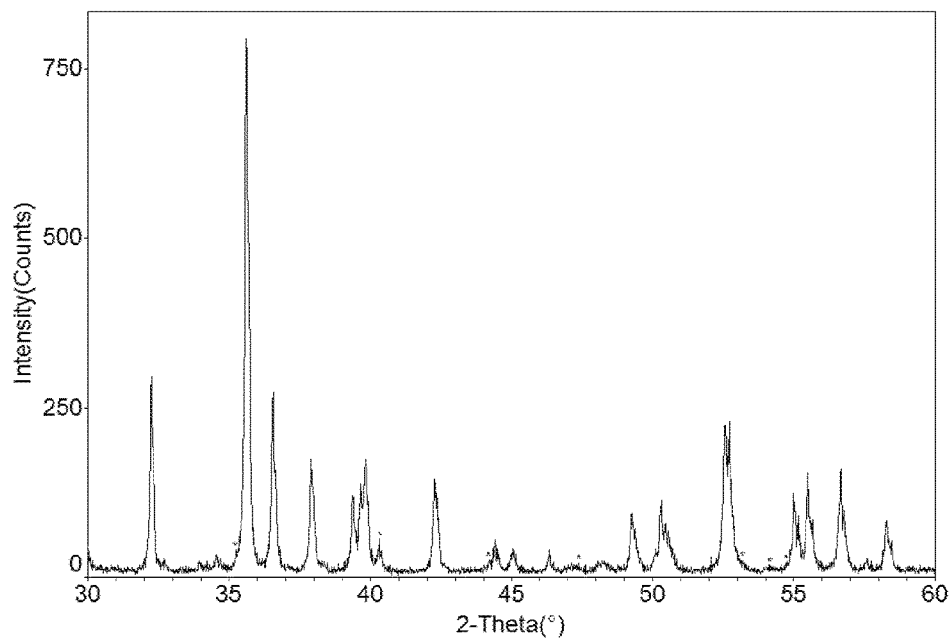
FIG. 11A is an XRD profile for $LiFePO_4/Fe_2P$ composite active material produced according to Example 11 of the present invention (asterisks denote peaks due to $Fe_2P$)
Figure 11B:
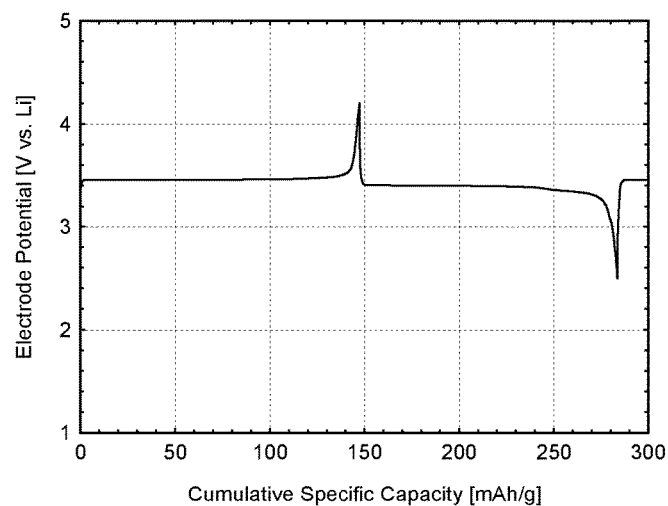
FIG. 11B shows the voltage profile (electrode potential versus cumulative specific capacity) for $LiFePO_4/Fe_2P$ composite active material produced according to Example 11 of the present invention.
Figure 11C:
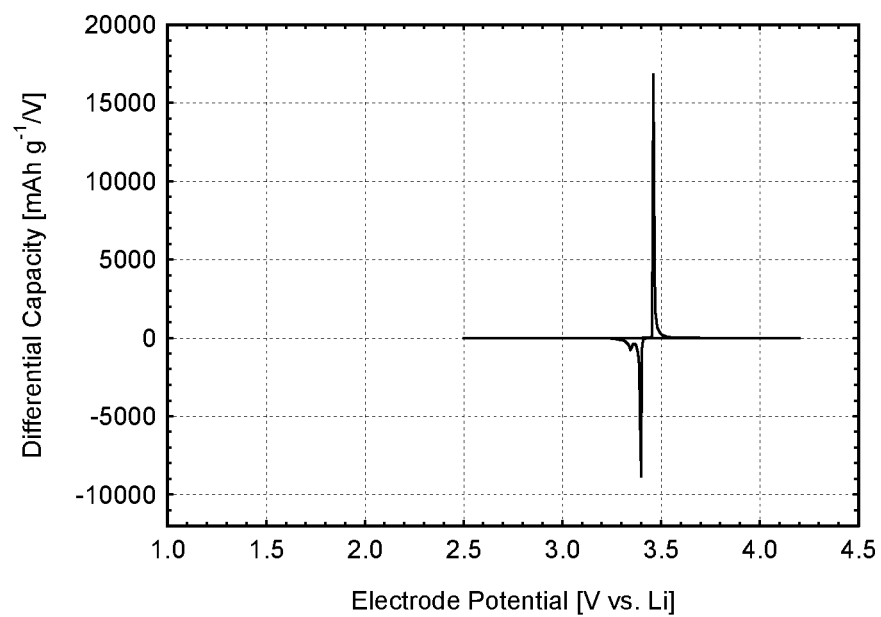
FIG. 11C shows the differential capacity profile (differential capacity versus electrode potential) for $LiFePO_4/Fe_2P$ composite active material produced according to Example 11 of the present invention.

FIG. 11 (Cell#209008) shows the first cycle constant current data for the $LiFePO_4$ cathode active material (X0740, made using $Fe_2O_3$ and Red P, using a 40% excess of Red P thereby producing a composite product of $LiFePO_4$ and $Fe_2P$) measured in a metallic lithium half-cell. FIG. 11B shows the voltage profile (electrode potential versus cumulative specific capacity) and FIG. 11C shows the differential capacity profile (differential capacity versus electrode potential). The constant current data shown in the figure were collected using a lithium metal counter electrode at a current density of 0.04 mA/cm$^2$ between voltage limits of 2.5 and 4.2 V. The non-aqueous electrolyte used was a 1 M solution of $LiPF_6$ in a 1:1 mixture of ethylene carbonate (EC) and diethyl carbonate (DEC). The electrochemical testing was carried out at a controlled temperature of 25° C.

The Open Circuit Voltage (OCV) of the as-made cell was 3.187 V vs. Li. Referring to FIG. 11B, during the first lithium extraction process, a charge equivalent to a material specific capacity of 146 mAh/g was obtained for the cathode active material. The subsequent re-insertion process corresponded to material specific capacity of 137 mAh/g, indicating the general reversibility of the lithium-ion insertion reactions.

The symmetrical nature of the charge-discharge voltage profile indicates the excellent reversibility of the system. This is further exemplified by the symmetrical nature of the differential capacity profile shown in FIG. 11O.

EXAMPLE 12

Figure 12:
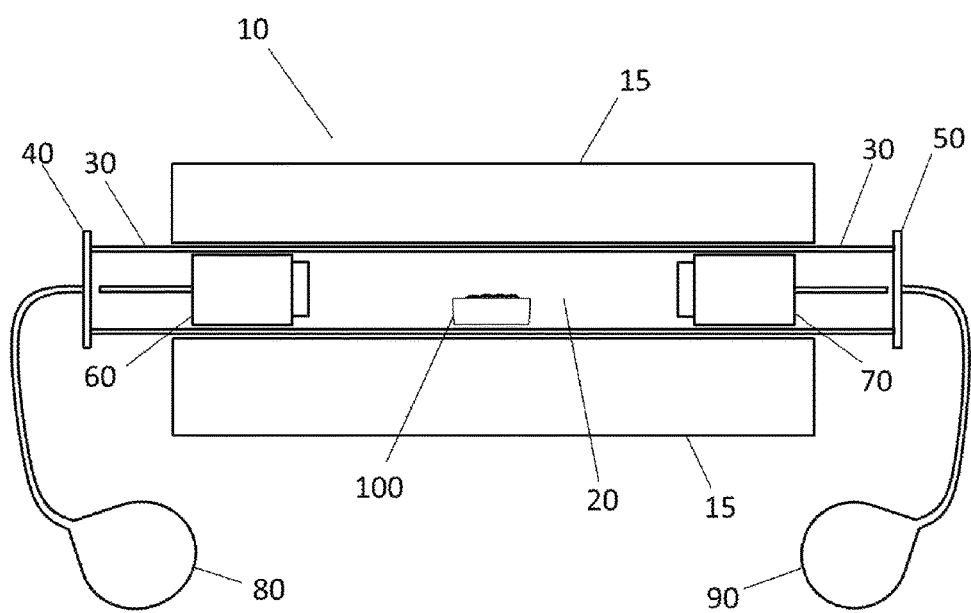
FIG. 12 shows the basic schematic diagram of a sealed tube furnace as used in Example 12 of the present invention.

This Example was performed using a tube furnace such as that depicted in FIG. 12. In detail, FIG. 12 shows a schematic view of a tube furnace 10 which comprises a tubular furnace body 15 which has a cylindrical reaction cavity 20 for receiving an open ended non-porous ceramic tube 30, and heating elements (not shown) for heating the cylindrical reaction cavity 20. Two stainless steel ends 40, 50 are provided to seal against the open ends of the non-porous ceramic tube 30, aided by two rubber gaskets (not shown) and held in place by clamps (not shown). Furnace baffles 60, 70 inside the non-porous ceramic tube 30, provide heat insulation. Expansion vessels 80, 90 are also provided to accommodate a change in volume of the gaseous components in the non-porous ceramic tube 30, as it is heated during the reaction process. A crucible 100 is positioned within the non-porous ceramic tube 30 for containing the reactants during the reaction process.

During the reaction process, an open ended non-porous ceramic tube 30 is placed within the cylindrical cavity 20 of the tubular furnace body 15 and a crucible 100 containing the starting materials and furnace baffles 60, 70 are all positioned inside the open ended non-porous ceramic tube 30 as shown in FIG. 12. The open ends of the open ended non-porous ceramic tube 30 are then sealed using the stainless steel ends 40, 50, under an atmosphere of air. The tubular furnace body 15 is then heated to the required reaction temperature and, as this proceeds, the pressure within the non-porous ceramic tube 30 is maintained at an approximately constant level by the expansion of the heated air being accommodated by the expansion vessels 80 and 90. After heating for the required reaction time, the tubular furnace body 15 is cooled sufficiently to allow removal of the crucible 100 from the non-porous ceramic tube 30, and recovery of the reaction products.

Figure 13A:
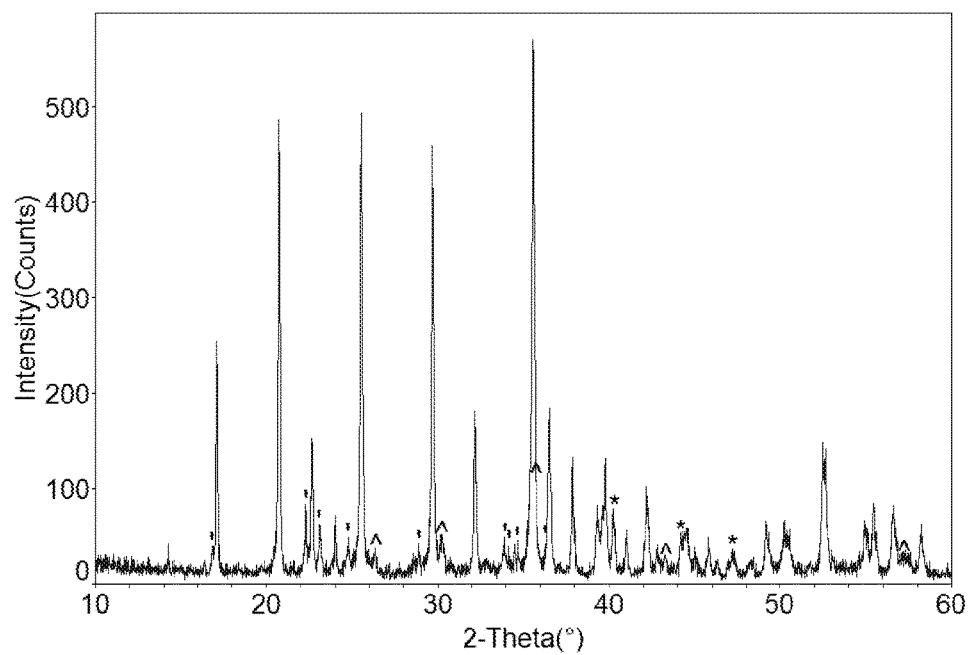
FIG. 13A is an XRD profile for $LiFePO_4$ produced according to Example 12 of the present invention (impurity peaks are denoted as *=$Fe_2P$, '=$Li_3PO_4$ and ^=$Fe_2O_3$.
Figure 13B:
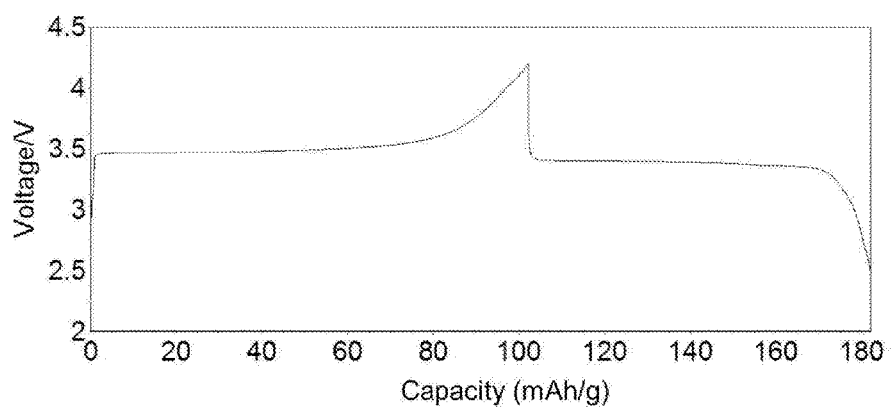
FIG. 13B shows the voltage profile (electrode potential versus cumulative specific capacity) for $LiFePO_4$ produced according to Example 12 of the present invention.

FIG. 13(B) (cell #0 305086) shows the Electrode Voltage (V vs. Li) versus Cumulative Cathode Specific Capacity (mAh/g)) are derived from the first cycle constant current cycling data for the $LiFePO_4$ (Sample X1322) active material in a metallic lithium half-cell. The electrolyte used was a 1.0 M solution of $LiPF_6$ in ethylene carbonate/diethyl carbonate. The constant current data were collected at a current density of 0.40 mA/cm$^2$ between voltage limits of 2.50 and 4.20 V vs. Li. The testing was carried out at 25° C.

During the cell charging process, lithium ions are extracted from the cathode active material. During the subsequent discharge process, lithium ions are re-inserted into the cathode active material. The first charge process corresponds to a cathode specific capacity of 102 mAh/g. The first discharge process corresponds to a cathode specific capacity of 80 mAh/g. These data demonstrate the reversibility of the lithium ion insertion reactions in the $LiFePO_4$ active material.

Figure 13C:
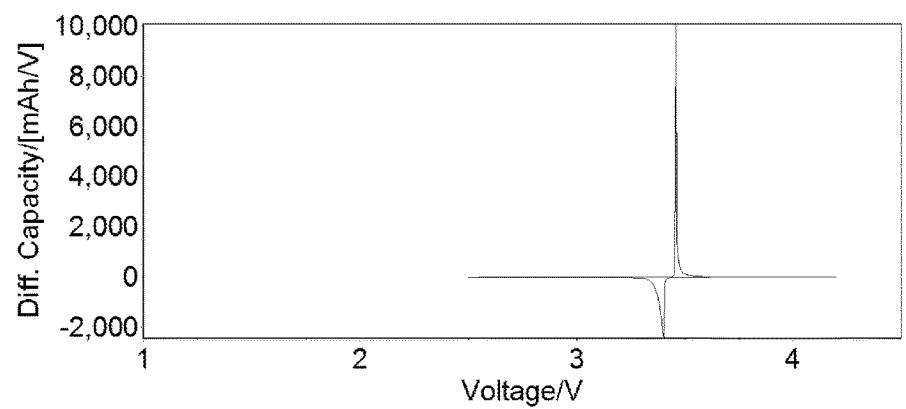
FIG. 13C shows the first cycle differential capacity profile (Differential Capacity versus Electrode Voltage (V vs. Li)) for $LiFePO_4$ prepared according to Example 12 of the present invention.

FIG. 13(C) (Cell#305086) shows the first cycle differential capacity profile (Differential Capacity (mAh/g/V) versus Electrode Voltage (V vs. Li)] for the LiFePO$_4$ (Sample X 1322 ) derived from the constant current cycling data shown in FIG. 13(B). Differential capacity data have been shown to allow characterization of the reaction reversibility, order-disorder phenomenon and structural phase changes within the ion insertion system.

The data presented in FIG. 13(C) for the LiFePO$_4$ cathode confirm the reversible lithium-ion insertion behaviour as characterized by the generally symmetrical nature of the differential capacity peaks during cell charge and discharge.

Figure 13D:
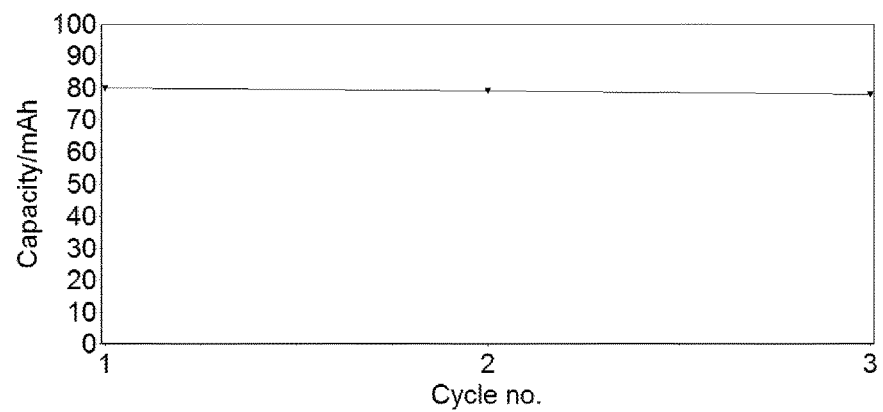
FIG. 13D shows the cycling performance (Cathode Specific Capacity (mAh/g) vs. Cycle Number) for $LiFePO_4$ prepared according to Example 12 of the present invention.

FIG. 13(D) (Cell#305086) shows the cycling performance (Cathode Specific Capacity (mAh/g) versus Cycle Number] for the LiFePO$_4$ (Sample X 1322) derived from constant current cycling data on the active material carried out in a metallic lithium half-cell. The electrolyte used was a 1.0 M solution of LiPF$_6$ in ethylene carbonate/diethyl carbonate. The constant current data were collected at a current density of 0.40 mA/cm$^2$ between voltage limits of 2.50 and 4.20 V vs. Li. The testing was carried out at 25° C.

The active material cycles at a cathode discharge specific capacity of around 80 mAh/g. These data again demonstrate the reversibility of the lithium ion insertion reactions in the LiFePO$_4$ active material.

The invention claimed is:

1. A process for the preparation of a metal-containing compound comprising the steps of:
   a) forming a mixture comprising:
      i) elemental phosphorus; and
      ii) one or more metal-containing precursor compounds, wherein the metal in each metal-containing precursor compound has an initial average oxidation state; and
   b) heating the mixture to a temperature of at least 300° C. to give a reaction product;
   wherein the one or more metal-containing precursor compounds comprise one or more metals selected from transition metals, non-transition metals and metalloids;
   wherein the initial average oxidation state of the one or more metals in the metal-containing precursor compounds is reduced during the reaction process;
   wherein at least a portion of the elemental phosphorous is oxidized and incorporated into the metal containing compound at an oxidation state higher than the oxidation state of elemental phosphorous; and
   further wherein the heating step b) is performed in the absence of a solvent, except optionally water.

2. The process according to claim 1 wherein the mixture further comprises one or more alkali metal-containing precursor compounds.

3. The process according to claim 1, wherein the metal-containing compound has the formula:

$$A_aM_b(X_cY_d)_eZ_f$$

wherein:
   A is an alkali metal selected from one or more of lithium, sodium and potassium;
   M comprises one or more metals selected from transition metals, non-transition metals, and metalloids;
   $(X_cY_d)_e$ is at least one first anion; and
   Z is at least one second anion
   wherein a ≥0; b >0; c >0; d ≥0; e >0 and f ≥0;
   wherein a, b, c, d, e and f are chosen to maintain electroneutrality.

4. The process according to claim 3 wherein M is a metal selected from one or more of titanium, vanadium, niobium, tantalum, hafnium, chromium, molybdenum, tungsten, manganese, iron, osmium, cobalt, nickel, palladium, platinum, copper, silver, gold, zinc, cadmium, aluminium, scandium, yttrium, zirconium, technetium, rhenium, ruthenium, rhodium, iridium, mercury, gallium, indium, tin, lead, bismuth, magnesium, calcium, beryllium, strontium and barium, boron, silicon, germanium, arsenic, antimony and tellurium.

5. The process according to claim 3 wherein X comprises one or more elements selected from titanium, vanadium, chromium, arsenic, molybdenum, tungsten, niobium, manganese, aluminium, selenium, boron, oxygen, carbon, silicon, phosphorus, nitrogen, sulfur, fluorine, chlorine, bromine and iodine.

6. The process according to claim 3 wherein Y is selected from one or more halides, sulfur-containing groups, oxygen-containing groups and mixtures thereof.

7. The process according to claim 3 wherein Z is selected from one or more halides, hydroxide-containing groups and mixtures thereof.

8. The process according to claim 3 wherein X comprises phosphorus.

9. The process according to claim 8 wherein $(X_cY_d)_e$ is a PO$_4$ and/or P$_2$O$_7$ moiety.

10. The process according to claim 3 wherein X comprises sulfur.

11. The process according to claim 10 wherein $(X_cY_d)_e$ is a SO$_4$ moiety.

12. The process according to claim 3 wherein when a=0, $(X_cY_d)_e$ is not a phosphide group.

13. The process according to claim 3, wherein the metal-containing compound is selected from one or more of the group consisting of LiFePO$_4$, LiMnPO$_4$, LiCoPO$_4$, LiNiPO$_4$, NaFePO$_4$, NaMnPO$_4$, NaCoPO$_4$, NaNiPO$_4$, LiMn$_{0.5}$Fe$_{0.2}$Mg$_{0.3}$PO$_4$, Li$_3$V$_2$(PO$_4$)$_3$, Na$_4$Fe$_3$(PO$_4$)$_2$P$_2$O$_7$, Na$_3$V$_2$(PO$_4$)$_3$, LiMn$_{0.5}$Fe$_{0.5}$PO$_4$, Na$_7$V$_4$(P$_2$O$_7$)$_4$PO$_4$, Na$_7$V$_3$(P$_2$O$_7$)$_4$, Na$_2$Fe(SO$_4$)$_2$, NaVPO$_4$F, LiVPO$_4$F, Na$_3$V(PO$_4$)$_2$, Li$_3$V(PO$_4$)$_2$, NaVOPO$_4$, LiVOPO$_4$, LiV$_2$O$_5$, NaV$_2$O$_5$, NaVO$_2$, VPO$_4$, MoP$_2$O$_7$, MoOPO$_4$, Fe$_3$(PO$_4$)$_2$, Na$_{8-2x}$Fe$_{4+x}$(P$_2$O$_7$)$_4$, Na$_{8-2x}$Mn$_{4+x}$(P$_2$O$_7$)$_4$, Na$_2$MnP$_2$O$_7$, Na$_2$FeP$_2$O$_7$, Na$_2$CoP$_2$O$_7$, Na$_4$Mn$_3$(PO$_4$)$_2$P$_2$O$_7$, Na$_4$Co$_3$(PO$_4$)$_2$P$_2$O$_7$, Na$_4$Ni$_3$(PO$_4$)$_2$P$_2$O$_7$, NaFeSO$_4$F, LiFeSO$_4$F, NaMnSO$_4$F, LiMnSO$_4$F, Na$_2$Fe$_2$(SO$_4$)$_3$, Li$_2$Fe$_2$(SO$_4$)$_3$, Li$_2$Fe(SO$_4$)$_2$, Na$_2$FePO$_4$F, Na$_2$MnPO$_4$F, Na$_2$CoPO$_4$F and Na$_2$NiPO$_4$F.

14. The process according to claim 3, wherein the metal-containing compound has the formula: LiMPO$_4$, where M is a metal selected from one or more of manganese, iron, cobalt, nickel, copper, zinc, magnesium and calcium.

15. The process according to claim 3, wherein the metal-containing compound is selected from one or more of Fe$_2$O$_3$, Fe$_3$O$_4$, FePO$_4$.xH$_2$O, FePO$_4$, Fe$_3$(PO$_4$)$_2$, FeSO$_4$.xH$_2$O, Fe(NO$_3$)$_3$, Fe(CH$_3$CO$_2$)$_2$, C$_6$H$_8$O$_7$xFe$^{3+}$.yNH$_3$ (ammonium iron (III) citrate), C$_6$H$_5$FeO$_7$ (iron (III) citrate) and Fe(C$_5$H$_7$O$_2$)$_3$ (iron (III) 2,4-petanedionate).

16. The process according to claim 1, wherein the mixture further comprises one or more conductive materials.

17. The process according to claim 3 wherein at least one conductive material is formed in situ during the heating step.

18. The process according to claim 1, wherein the mixture further comprises one or more compounds selected from LiH$_2$PO$_4$, Li$_2$CO$_3$, Li$_2$HPO$_4$, LiOH, LiOH.H$_2$O, H$_3$PO$_4$, (NH$_4$)$_2$HPO$_4$ and (NH$_4$)H$_2$PO$_4$.

19. The process according to claim 1 wherein step b) is conducted under an atmosphere comprising a partial pressure of oxygen.

20. The process according to claim 1 wherein the elemental phosphorus comprises red phosphorus.

21. The process according to claim 16, wherein the at least one conductive material comprises one or more of a transition metal phosphide, a non-transition metal phosphide, or metalloid phosphide.

22. The process according to claim 1, wherein the reaction product comprises $LiFePO_4$ and at least one conductive phosphide-containing compounds.

* * * * *